(12) United States Patent
Yoshikawa

(10) Patent No.: US 10,254,001 B2
(45) Date of Patent: Apr. 9, 2019

(54) AIR-CONDITIONING CONTROL APPARATUS

(71) Applicant: DAIKIN INDUSTRIES, LTD., Osaka-shi, Osaka (JP)

(72) Inventor: Satoshi Yoshikawa, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 14 days.

(21) Appl. No.: 15/556,120

(22) PCT Filed: Mar. 9, 2016

(86) PCT No.: PCT/JP2016/057456
§ 371 (c)(1),
(2) Date: Sep. 6, 2017

(87) PCT Pub. No.: WO2016/143831
PCT Pub. Date: Sep. 15, 2016

(65) Prior Publication Data
US 2018/0045427 A1   Feb. 15, 2018

(30) Foreign Application Priority Data

Mar. 9, 2015   (JP) ................................. 2015-046093

(51) Int. Cl.
*F24F 11/00*   (2018.01)
*F24F 11/62*   (2018.01)
(Continued)

(52) U.S. Cl.
CPC .............. *F24F 11/62* (2018.01); *F24F 11/30* (2018.01); *F24F 11/46* (2018.01); *F24F 11/56* (2018.01);
(Continued)

(58) Field of Classification Search
CPC combination set(s) only.
See application file for complete search history.

(56) References Cited

U.S. PATENT DOCUMENTS 5,052,186 A * 10/1991 Dudley ..................... F24H 4/04
62/215
5,318,224 A * 6/1994 Darby ................ G05D 23/1905
236/47

(Continued)

FOREIGN PATENT DOCUMENTS

CN        107429932 A  * 12/2017  .............. F24F 11/30
CN        107429933 A  * 12/2017  .............. F24F 11/30
(Continued)

OTHER PUBLICATIONS

International Search Report of corresponding PCT Application No. PCT/JP2016/057456 dated Jun. 7, 2016.
(Continued)

*Primary Examiner* — Laura M Menz
(74) *Attorney, Agent, or Firm* — Global IP Counselors, LLP

(57) ABSTRACT

An air-conditioning control apparatus includes an away detector, a position acquisition unit, a distance acquisition unit, an instrument control unit, and a learning storage unit. The away detector detects that a user is away from a building. The position acquisition unit acquires position information of a portable terminal carried by the user. The distance acquisition unit uses the position information acquired by the position acquisition unit to acquire distance information indicating how far the portable terminal is from the building when the away detector has detected that the user is away from the building. The instrument control unit controls an air conditioner installed in the building based on the distance information acquired by the distance acquisition unit so that the air conditioner consumes less energy.

6 Claims, 18 Drawing Sheets

(51) Int. Cl.
*F24F 11/30* (2018.01)
*F24F 11/56* (2018.01)
*F24F 11/46* (2018.01)
*F24F 11/83* (2018.01)
*G05B 19/048* (2006.01)
*F24F 120/12* (2018.01)
*F24F 120/10* (2018.01)
*F24F 11/85* (2018.01)
*F24F 11/64* (2018.01)

(52) U.S. Cl.
CPC ............ *F24F 11/83* (2018.01); *G05B 19/048* (2013.01); *F24F 11/64* (2018.01); *F24F 11/85* (2018.01); *F24F 2120/10* (2018.01); *F24F 2120/12* (2018.01); *G05B 2219/2614* (2013.01)

(56) References Cited

U.S. PATENT DOCUMENTS

| | | | |
|---|---|---|---|
| 2006/0186214 A1* | 8/2006 | Simon | G05D 23/1902 236/1 C |
| 2013/0025840 A1* | 1/2013 | Remme | F24F 11/30 165/237 |
| 2013/0073094 A1 | 3/2013 | Knapton et al. | |
| 2013/0166073 A1* | 6/2013 | Pine | F24F 11/30 700/276 |
| 2014/0277762 A1* | 9/2014 | Drew | G05D 23/1904 700/276 |
| 2015/0159893 A1* | 6/2015 | Daubman | G05B 15/02 700/278 |
| 2015/0338116 A1* | 11/2015 | Furuta | H04L 12/2818 700/276 |
| 2018/0045427 A1* | 2/2018 | Yoshikawa | F24F 11/30 |
| 2018/0045474 A1* | 2/2018 | Yoshikawa | F24F 11/30 |
| 2018/0143601 A1* | 5/2018 | Chavan | F24F 11/30 |
| 2018/0299152 A1* | 10/2018 | Libal | F24F 11/30 |

FOREIGN PATENT DOCUMENTS

| | | | |
|---|---|---|---|
| EP | 2 607 802 A2 | 6/2013 | |
| EP | 2 610 558 A2 | 7/2013 | |
| EP | 3270072 A1 * | 1/2018 | ............ F24F 11/30 |
| EP | 3270073 A1 * | 1/2018 | ............ F24F 11/30 |
| EP | 3270072 A4 * | 2/2018 | ............ F24F 11/30 |
| EP | 3270073 A4 * | 2/2018 | ............ F24F 11/30 |
| JP | 2003-74942 A | 3/2003 | |
| JP | 2005-295160 A | 10/2005 | |
| JP | 2006-64324 A | 3/2006 | |
| JP | 2008-209035 A | 9/2008 | |
| JP | 2013-139954 A | 7/2013 | |
| JP | 2014-3391 A | 1/2014 | |
| JP | 2014-173818 A | 9/2014 | |
| WO | 2014/188670 A1 | 11/2014 | |
| WO | WO-2016143830 A1 * | 9/2016 | ............ F24F 11/30 |
| WO | WO-2016143831 A1 * | 9/2016 | ............ F24F 11/30 |

OTHER PUBLICATIONS

International Preliminary Report of corresponding PCT Application No. PCT/JP2016/057456 dated Sep. 21, 2017.
European Search Report of corresponding EP Application No. 16 76 1798.4 dated Jan. 26, 2018.

\* cited by examiner

AIR-CONDITIONING CONTROL APPARATUS

CROSS-REFERENCE TO RELATED APPLICATIONS

This U.S. National stage application claims priority under 35 U.S.C. § 119(a) to Japanese Patent Application No. 2015-046093, filed in Japan on Mar. 9, 2015, the entire contents of which are hereby incorporated herein by reference.

TECHNICAL FIELD

The present invention relates to an air-conditioning control apparatus.

BACKGROUND ART

In the prior art, apparatuses and systems have been used to control an air conditioner on the basis of position information of a user of a building in which the air conditioner is installed. For example, Japanese Laid-open Patent Publication No. 2014-1738181 discloses an air-conditioning control apparatus to acquire a current position of a portable terminal carried by the user who is away from the building, and control the air conditioner on the basis of a distance between the portable terminal and the air conditioner. This air-conditioning control apparatus determines that the user is about to return and starts up the air conditioner when the distance between the portable terminal and the air conditioner, i.e., the distance between the user and the air conditioner is equal to or less than a predetermined threshold value. Additionally, when the rate of decrease of the distance between the user and the air conditioner is less than a predetermined threshold value, the air-conditioning control apparatus determines that the user is not approaching the air conditioner and stops the operation of the air conditioner in cases in which the air conditioner has been started up. Therefore, this air-conditioning control apparatus can suppress energy needlessly consumed by the air conditioner by controlling the air conditioner in accordance with the current position of the user when the user is returning.

SUMMARY OF THE INVENTION

Technical Problem

This air-conditioning control apparatus can suppress the energy consumption of the air conditioner when the user is away while the air conditioner is stopping. However, when the user is away for a short time while the air conditioner is starting up, there is a risk that the air conditioner will automatically stop while the user is away and that the user will experience discomfort upon returning. There is also a risk that, regardless of the user being away for a long time, the air conditioner will repeatedly start and stop and energy will be needlessly consumed due to the distance between the user and the air conditioner being short and the user continuing to travel. Thus, a prior-art air-conditioning control apparatus is unable to appropriately control the air conditioner in accordance with events while the user is away, and is therefore subject to problems such as user discomfort and needless energy consumption.

An object of the present invention is to provide an air-conditioning control apparatus that can conserve energy as well as maintain a comfort level.

Solution to Problem

An air-conditioning control apparatus according to a first aspect of the present invention comprises an away detector, a position acquisition unit, a distance acquisition unit, and an instrument control unit. The away detector detects that a user is away from a building. The position acquisition unit acquires position information of a portable terminal carried by the user. Using the position information acquired by the position acquisition unit, the distance acquisition unit acquires distance information indicating how far the portable terminal is from the building when the away detector has detected that the user is away. The instrument control unit controls an air conditioner installed in the building on the basis of the distance information acquired by the distance acquisition unit so that the air conditioner consumes less energy.

From the time the user leaves the building until the time the user returns, the air-conditioning control apparatus according to the first aspect performs a control to suppress the energy consumption of the air conditioner in the building, solely on the basis of the distance information indicating how far the portable terminal carried by the user is from the building. For example, a control is performed to further suppress the energy consumption of the air conditioner as the distance between the portable terminal and the building becomes longer, whereby the energy consumption of the air conditioner is effectively suppressed when the user is away for a long time, and the comfort level in the building is effectively maintained when the user is away for a short time. Therefore, the air-conditioning control apparatus according to the first aspect can conserve energy as well as maintain the comfort level.

An air-conditioning control apparatus according to a second aspect of the present invention is the air-conditioning control apparatus according to the first aspect, wherein the instrument control unit controls the air conditioner by changing a setback value, which is a difference between a set temperature of the air conditioner when the away detector detects that the user is away, and a current set temperature.

The air-conditioning control apparatus according to the second aspect changes the set temperature of the air conditioner by changing the setback value on the basis of the distance information while the user is away. Therefore, the air-conditioning control apparatus according to the second aspect can conserve energy as well as maintain the comfort level.

An air-conditioning control apparatus according to a third aspect of the present invention is the air-conditioning control apparatus according to the second aspect, wherein the distance acquisition unit acquires a distance between the building and the portable terminal as the distance information. When the air conditioner is performing an air-warming operation, the instrument control unit progressively increases the setback value to lower the set temperature as the distance between the building and the portable terminal becomes longer, and when the air conditioner is performing an air-cooling operation, the instrument control unit progressively increases the setback value to raise the set temperature as the distance between the building and the portable terminal becomes longer.

With the air-conditioning control apparatus according to the third aspect, as the distance between the building and the portable terminal of the user becomes greater, the setback value is progressively increased to lower the energy consumption of the air conditioner. Therefore, the air-conditioning control apparatus according to the third aspect can conserve energy as well as maintain the comfort level.

An air-conditioning control apparatus according to a fourth aspect of the present invention is the air-conditioning control apparatus according to the third aspect, wherein the instrument control unit uses a plurality of distance ranges based on a plurality of preset distance threshold values to change the setback value in accordance with the distance range to which the distance between the building and the portable terminal belongs.

With the air-conditioning control apparatus according to the fourth aspect, the setback value is set to a predetermined value when the distance between the building and the portable terminal of the user is within a predetermined distance range. This air-conditioning control apparatus is able to set the optimal setback value according to the distance range. Therefore, the air-conditioning control apparatus according to the fourth aspect can conserve energy as well as maintain the comfort level.

An air-conditioning control apparatus according to a fifth aspect of the present invention is the air-conditioning control apparatus according to the fourth aspect, further comprising a learning storage unit. The learning storage unit learns and stores the distance threshold value and the setback value. The instrument control unit refers to the learning storage unit to change the distance threshold value or the setback value so that the air conditioner consumes less energy.

With the air-conditioning control apparatus according to the fifth aspect, the optimal distance range or the optimal setback value can be set on the basis of past data pertaining to the distance range and the setback value. Therefore, the air-conditioning control apparatus according to the fifth aspect can conserve energy as well as maintain the comfort level.

An air-conditioning control apparatus according to a sixth aspect of the present invention is the air-conditioning control apparatus according to any of the third through fifth aspects, wherein the instrument control unit calculates the setback value based on the distance between the building and the portable terminal for each one of a plurality of the portable terminals, and controls the air conditioner using the smallest setback value.

With the air-conditioning control apparatus according to the sixth aspect, the optimal setback value can be set to control the air conditioner even when there are a plurality of users of the building. Therefore, the air-conditioning control apparatus according to the sixth aspect can conserve energy as well as maintain the comfort level.

An air-conditioning control apparatus according to a seventh aspect of the present invention is the air-conditioning control apparatus according to any of the first through sixth aspects, wherein the instrument control unit controls the air conditioner via any one of a first control to a sixth control. The first control is a control to change an operating frequency of the air conditioner. The second control is a control to change an evaporation temperature of a refrigerant of the air conditioner. The third control is a control to change a water supply temperature or an air supply temperature of the air conditioner. The fourth control is a combination control of the first control and the second control. The fifth control is a combination control of the first control and the third control. The sixth control is a combination control of the first control, the second control, and the third control.

With the air-conditioning control apparatus according to the seventh aspect, the air conditioner is controlled by changing the operating frequency of the air conditioner on the basis of the distance information while the user is away. The operating frequency of the air conditioner is the operating frequency of a compressor inside the air conditioner. The air-conditioning control apparatus performs a control to, e.g., progressively lower the operating frequency of the air conditioner as the distance between the portable terminal and the building becomes longer, to suppress the energy consumption of the air conditioner. Additionally, this air-conditioning control apparatus controls the air conditioner by changing the evaporation temperature of the refrigerant of the air conditioner on the basis of the distance information while the user is away. For example, the air-conditioning control apparatus performs a control to raise the evaporation temperature of the refrigerant of the air conditioner during the air-cooling operation. Additionally, this air-conditioning control apparatus controls the air conditioner by changing the water supply temperature or the air supply temperature of the air conditioner on the basis of the distance information while the user is away. For example, the air-conditioning control apparatus performs a control to further raise the water supply temperature or the air supply temperature of the air conditioner during the air-cooling operation, and to further lower the water supply temperature or the air supply temperature of the air conditioner during the air-warming operation. Additionally, this air-conditioning control apparatus may control the air conditioner by changing the operating frequency and the evaporation temperature of the refrigerant. Additionally, this air-conditioning control apparatus may control the air conditioner by changing either the operating frequency and the water supply temperature, or the operating frequency and the air supply temperature. Additionally, this air-conditioning control apparatus may control the air conditioner by changing the water supply temperature or the air supply temperature in addition to the operating frequency and the evaporation temperature of the refrigerant. Through these controls, the energy consumption of the air conditioner is suppressed, and the air-conditioning control apparatus can be operated more efficiently. Therefore, the air-conditioning control apparatus according to the seventh aspect can conserve energy as well as maintain the comfort level.

An air-conditioning control apparatus according to an eighth aspect of the present invention is the air-conditioning control apparatus according to the seventh aspect, wherein the instrument control unit changes the operating frequency to be within a range from a predetermined lower limit value to a predetermined upper limit value in the first control, the fourth control, the fifth control, and the sixth control.

With the air-conditioning control apparatus according to the eighth aspect, because a lower limit value and an upper limit value are set on the operating frequency of the air conditioner, the occurrence of the problem of a too-low operating efficiency of the air conditioner is suppressed. Therefore, the air-conditioning control apparatus according to the eighth aspect can perform efficient operation.

Advantageous Effects of Invention

The air-conditioning control apparatus according to the first through eighth aspects of the present invention can conserve energy as well as maintain a comfort level.

DESCRIPTION OF EMBODIMENTS

First Embodiment

An air-conditioning control system including an air-conditioning control apparatus according to a first embodiment of the present invention is described with reference to the drawings. The air-conditioning control system uses a portable terminal, which a user of a building carries on their person while away from the building, to control an air conditioner installed in the building. The "building" could be a detached residence, dwelling units of a multiple dwelling house, or offices of an office building, etc. The "user" could be a resident of a dwelling, a worker in an office, etc.

In the present embodiment, the "building" is a detached residence and the "user" is a single resident of the detached residence.

(1) Configuration of Air-Conditioning Control System

Figure 1:
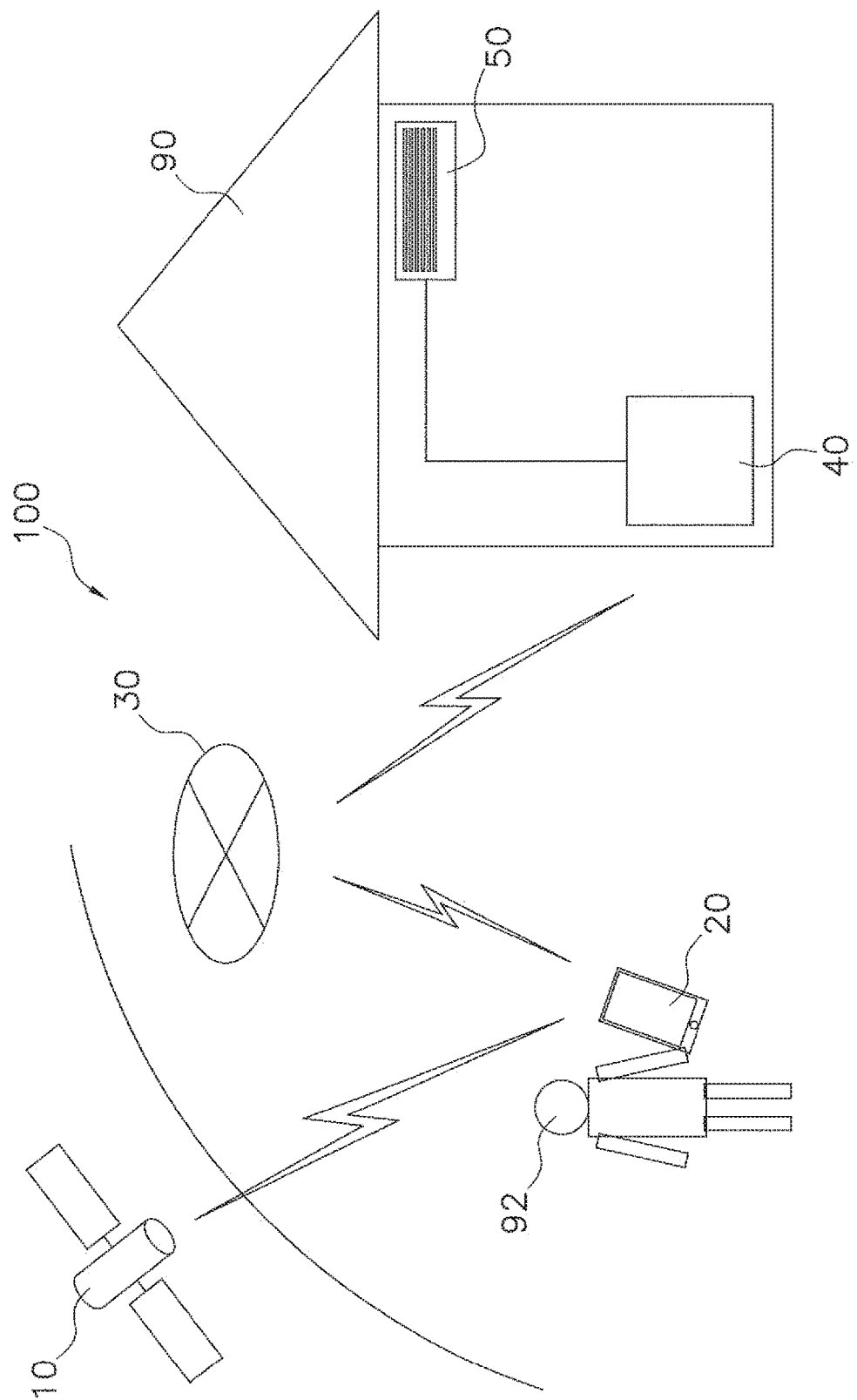
FIG. 1 is a schematic configuration diagram of an air-conditioning control system including an air-conditioning control apparatus according to a first embodiment.
Figure 2:
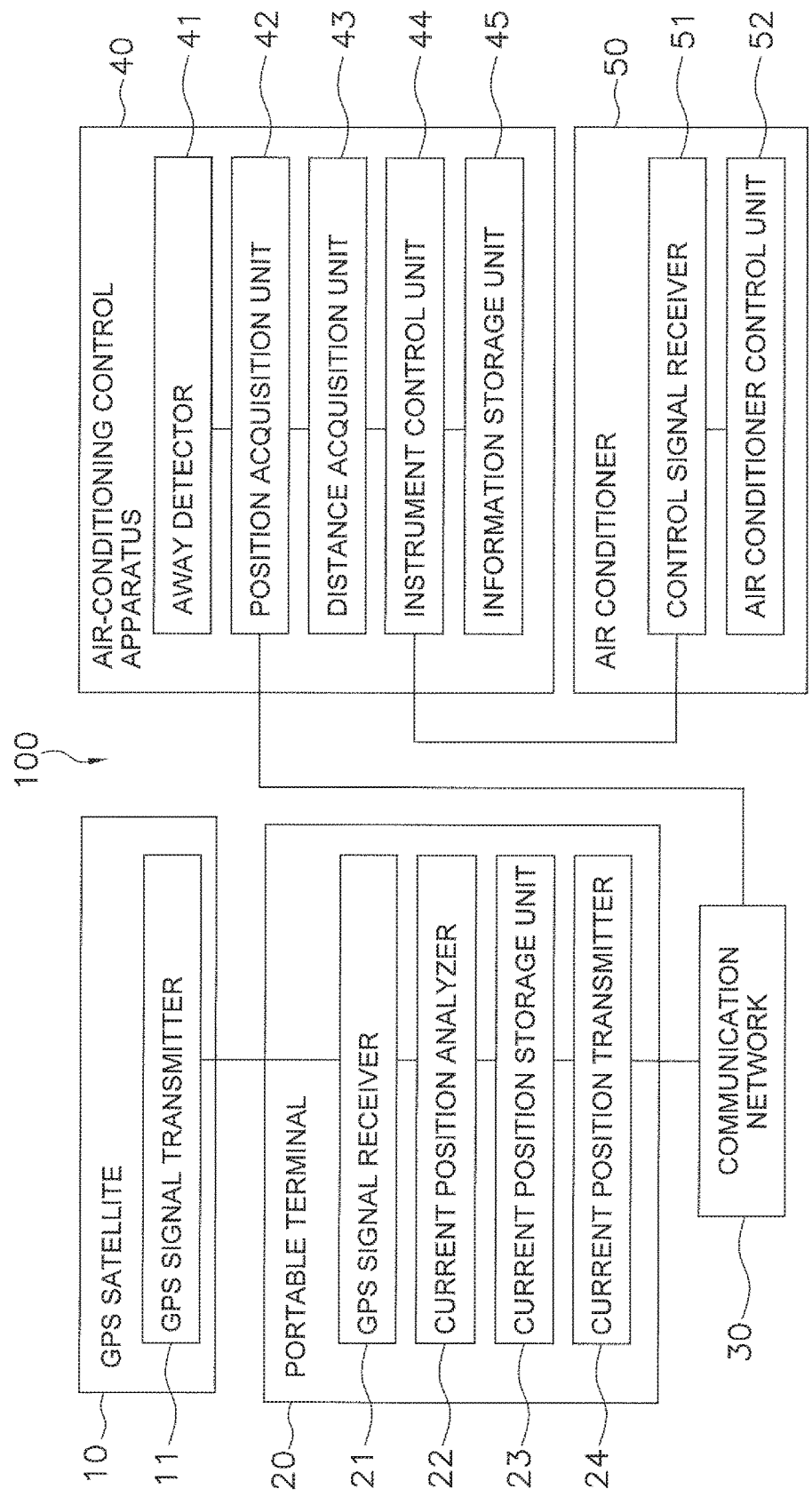
FIG. 2 is a block diagram showing the detailed configuration of the air-conditioning control system.

FIG. 1 is a schematic configuration diagram of an air-conditioning control system 100 including an air-conditioning control apparatus 40. FIG. 2 is a block diagram showing the detailed configuration of the air-conditioning control system 100 shown in FIG. 1. The air-conditioning control system 100 is mainly configured from a GPS satellite 10, a portable terminal 20, a communication network 30, the air-conditioning control apparatus 40, and an air conditioner 50.

(1-1) GPS Satellite

The GPS satellite 10 has a global positioning system (GPS) function for specifying the current position of the portable terminal 20. The GPS satellite 10 mainly includes a GPS signal transmitter 11. The GPS signal transmitter 11 wirelessly transmits the flight position and other data of the GPS satellite 10 to the portable terminal 20. Normally, a plurality of GPS satellites 10 are used in order to specify the position on the earth's surface, using a GPS. Therefore, while not shown in FIG. 1, data is wirelessly transmitted to the portable terminal 20 from a plurality of GPS satellites 10.

(1-2) Portable Terminal

The portable terminal 20 is a small instrument that a user 92 of a building 90 holds and carries on their person while away from the building. The portable terminal 20 has a GPS function for receiving radio waves from the GPS satellites 10 and specifying the current position of the terminal. The portable terminal 20 is a portable telephone, a smartphone, a tablet terminal, etc. The portable terminal 20 mainly includes a GPS signal receiver 21, a current position analyzer 22, a current position storage unit 23, and a current position transmitter 24.

The GPS signal receiver 21 wirelessly receives flight positions and other data of the GPS satellites 10 from the GPS signal transmitters 11 of the plurality of GPS satellites 10, and inputs this data to the current position analyzer 22.

On the basis of, inter alia, the data received from the GPS satellites 10 by the GPS signal receiver 21, and radio wave transmission time from the GPS satellites 10, the current position analyzer 22 estimates the distances between the portable terminal 20 and the GPS satellites 10. The current position analyzer 22 then uses the estimated distances to the GPS satellites 10 and the flight positions of the GPS satellites 10 to calculate the current position of the portable terminal 20 by an analytical technique. The current position of the portable terminal 20 may be represented in latitude and longitude coordinates or in some other format.

The current position storage unit 23 stores the current position of the portable terminal 20 calculated by the current position analyzer 22.

Via the communication network 30, the current position transmitter 24 transmits the current position of the portable terminal 20 stored in the current position storage unit 23 to the air-conditioning control apparatus 40.

(1-3) Communication Network

The communication network 30 is any communication circuit network that enables communication between the portable terminal 20 and the air-conditioning control apparatus 40. The communication network 30 can utilize an internet connection. For example, the portable terminal 20 is wirelessly connected with an internet connection via, inter alia, a 3G network and an LTE network, and the air-conditioning control apparatus 40 is connected with an internet connection via, inter alia, a LAN network and a Wifi® spot installed in the building 90.

(1-4) Air-Conditioning Control Apparatus

The air-conditioning control apparatus 40 is a computer installed in the building 90. The air-conditioning control apparatus 40 is a dedicated electronic instrument including a micro-controller and an input/output interface. The air-conditioning control apparatus 40 is connected either by wires or wirelessly with the air conditioner 50 installed in the building 90. The micro-controller of the air-conditioning control apparatus 40 mainly stores: programs comprising an away detector 41, a position acquisition unit 42, a distance acquisition unit 43, an instrument control unit 44, and an information storage unit 45; and data used by these programs.

The away detector 41 detects that the user 92 is away from the building 90. For example, the away detector 41 analyzes images captured by a monitoring camera (not shown) installed in an entrance/exit of the building 90, and detects that the user 92 is away. In this case, the monitoring camera, which is connected either by wires or wirelessly with the air-conditioning control apparatus 40, captures the face of a person passing through the entrance/exit of the building 90. When the away detector 41 has detected that the user 92 of the building 90 has moved from the inside of the building 90 to the outside of the building 90, the user 92 is determined to be away from the building 90. When the away detector 41 has detected that the user 92 of the building 90 has moved from the outside of the building 90 to the inside of the building 90, the user 92 is determined to have returned to the building 90.

The position acquisition unit 42 receives and acquires the current position of the portable terminal 20 transmitted from the current position transmitter 24 of the portable terminal 20. The position acquisition unit 42 causes the information storage unit 45 to store the acquired current position of the portable terminal 20. The position acquisition unit 42 acquires the current position of the portable terminal 20 at predetermined intervals. The predetermined interval is an interval that does not impose an excessive load on the micro-controller of the air-conditioning control apparatus 40; e.g., one second.

When the away detector 41 has detected that the user 92 is away, the distance acquisition unit 43 acquires distance information from the current position of the portable terminal 20 stored in the information storage unit 45, and the position of the building 90. The distance information includes at least a terminal distance, which is a linear distance between the portable terminal 20 and the building 90 on the earth's surface. The position of the building 90 is represented in the same format as the current position of the portable terminal 20. Because the portable terminal 20 is held by the user 92, the current position of the portable terminal 20 is the current position of the user 92 who is away. Therefore, the term "terminal distance" means the minimum distance between the user 92 who is away and the building 90. While the user 92 is inside the building 90, the terminal distance is zero.

The instrument control unit 44 controls the air conditioner 50 on the basis of the distance information acquired by the distance acquisition unit 43, so that the air conditioner 50 installed in the building 90 consumes little energy. Specifically, the instrument control unit 44 controls the air conditioner 50 by changing a setback value. The setback value is the difference between an away-time set temperature, which is the set temperature of the air conditioner 50 when the away detector 41 has detected that the user 92 is away, and the current set temperature of the air conditioner 50. The away-time set temperature is also the set temperature of the air conditioner 50 when the user 92 is inside the building 90. The away-time set temperature does not change from the time the user 92 leaves the building 90 until the time the user 92 returns. Therefore, the instrument control unit 44 can change the current set temperature of the air conditioner 50 by changing the setback value. The instrument control unit 44 transmits control signals at predetermined intervals to the air conditioner 50 to control the air conditioner 50. The predetermined interval is an interval that does not impose an excessive load on the micro-controller of the air-conditioning control apparatus 40, e.g., one second. The control signals include, inter alia, data pertaining to the set temperature of the air conditioner 50, which has been changed by the instrument control unit 44.

The information storage unit 45 stores the current position of the portable terminal 20, the position of the building 90, the set temperature of the air conditioner 50, the setback value, and other data.

(1-5) Air Conditioner

The air conditioner 50 is an air-cooling and air-warming instrument including a refrigeration circuit. The air conditioner 50 may include a boiler or another combustion air-warming apparatus. The air conditioner 50 mainly includes a control signal receiver 51 and an air conditioner control unit 52.

The control signal receiver 51 receives control signals transmitted from the instrument control unit 44 of the air-conditioning control apparatus 40.

The air conditioner control unit 52 controls the cooling and heating operations of the air conditioner 50 on the basis of the control signals received by the control signal receiver 51. Specifically, the air conditioner control unit 52 acquires from the control signals the set temperature of the air conditioner 50 changed by the instrument control unit 44, and controls the air conditioner 50 on the basis of the acquired set temperature.

(2) Action of Air-Conditioning Control System

Control of the air conditioner 50 by the air-conditioning control apparatus 40 of the air-conditioning control system 100 shall be described. When the air conditioner 50 is performing an air-warming operation, the instrument control unit 44 of the air-conditioning control apparatus 40 increases the setback value by a greater amount and lowers the set temperature of the air conditioner 50 further with longer terminal distances. When the air conditioner 50 is performing an air-cooling operation, the instrument control unit 44 increases the setback value by a greater amount and raises the set temperature of the air conditioner 50 further with longer terminal distances. Thus, while the user 92 is away from the building 90, the set temperature of the air conditioner 50 is automatically controlled on the basis of the setback value changed by the instrument control unit 44. While the user 92 is inside the building 90, the setback value is zero and the air conditioner 50 operates on the basis of the set temperature.

During the air-warming operation, the setback value is the away-time set temperature minus the current set temperature of the air conditioner 50. Therefore, during the air-warming operation, the set temperature of the air conditioner 50 is changed to lower values as the setback value is greater. During the air-cooling operation, the setback value is the current set temperature of the air conditioner 50 minus the away-time set temperature. Therefore, during the air-cooling operation, the set temperature of the air conditioner 50 after the change is changed to higher values as the setback value is greater. Commonly, the set temperature of the air conditioner 50 further approaches the outside air temperature as the setback value becomes greater, and the air conditioner 50 therefore consumes less energy.

Figure 3:
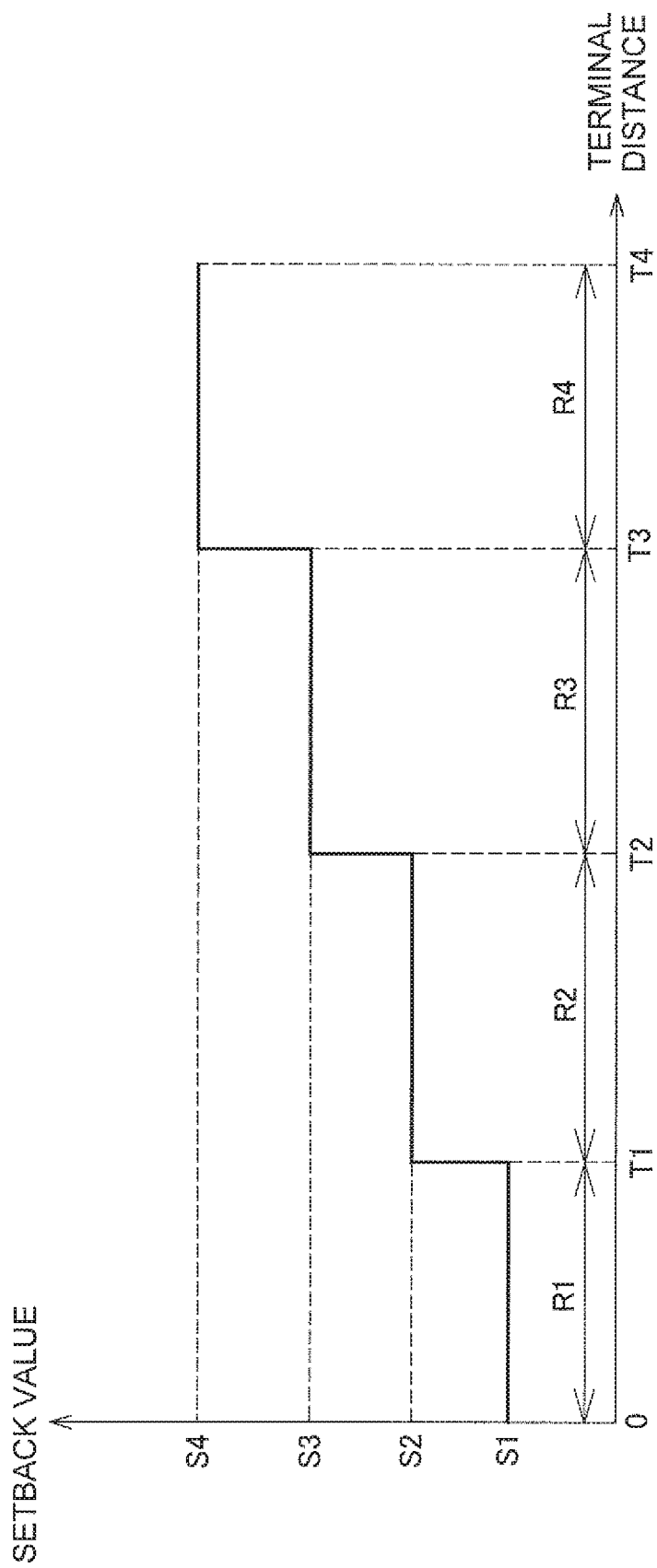
FIG. 3 is a graph showing the relationship between setback values and terminal distances.

FIG. 3 is a graph showing the relationship between the setback value and the terminal distance. In FIG. 3, the vertical axis represents setback values and the horizontal axis represents terminal distances. When the terminal distance increases, the setback value becomes greater in steps, as shown in FIG. 3. Specifically, the setback value is constant while the terminal distance is in a predetermined range. A terminal distance at which the setback value changes is referred to hereinafter as a distance threshold value. FIG. 3 shows, in order beginning with the smallest values, distance threshold values T1 to T4 and setback values S1 to S4. The distance threshold values T1 to T4 have the relationship T1<T2<T3<T4, and the distance threshold value T1 is greater than zero. The setback values S1 to S4 have the relationship S1<S2<S3<S4, and the setback value S1 is equal to or greater than zero. The distance threshold values T1 to T4 and the setback values S1 to S4 are set manually by someone such as a manager of the air-conditioning control system 100.

FIG. 3 shows distance ranges R1 to R4. The distance range R1 is a range in which the terminal distance is greater than zero and equal to or less than T1. The distance range R2 is a range in which the terminal distance is greater than T1 and equal to or less than T2. The distance range R3 is a range in which the terminal distance is greater than T2 and equal to or less than T3. The distance range R4 is a range in which the terminal distance is greater than T3 and equal to or less than T4. When the terminal distance is in the distance range R1, the setback value is S1. When the terminal distance is in the distance range R2, the setback value is S2. When the terminal distance is in the distance range R3, the setback value is S3. When the terminal distance is in the distance range R4, the setback value is S4. Thus, the instrument control unit 44 set the setback value in accordance with the distance ranges R1 to R4 with which the terminal distances are associated, on the basis of the preset distance threshold values T1 to T4.

Figure 4:
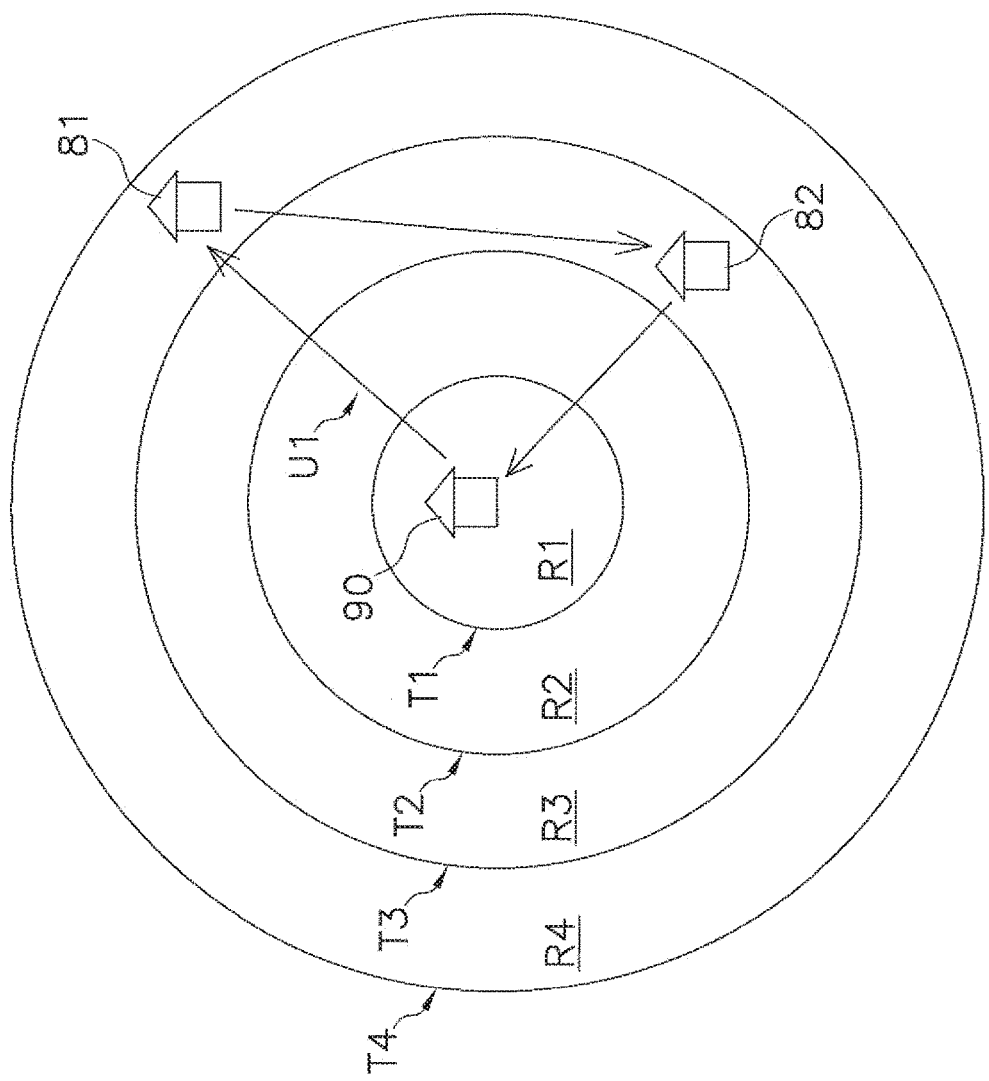
FIG. 4 is a drawing of an example of a behavior pattern of a user while away from the building.

FIG. 4 is a drawing of an example of a behavior pattern while away from the building, for a user 92 holding the portable terminal 20. In FIG. 4, a first away route U1, by which the user 92 leaves the building 90 and then returns, is shown by the arrows. FIG. 4 shows the distance threshold values T1 to T4 and the distance ranges R1 to R4. The user 92 leaves the building 90 at time t1, stays at a first visit destination 81 from time t2 to t3, stays at a second visit destination 82 from time t4 to t5, and returns to the building 90 at time t6. The time period from t1 to t2 is a travel time from the building 90 to the first visit destination 81. The time period from time t3 to t4 is a travel time from the first visit destination 81 to the second visit destination 82. The time period from time t5 to t6 is a travel time from the second visit destination 82 to the building 90. The first visit destination 81 belongs within the distance range R4. The second visit destination 82 belongs within the distance range R3.

Figure 5:
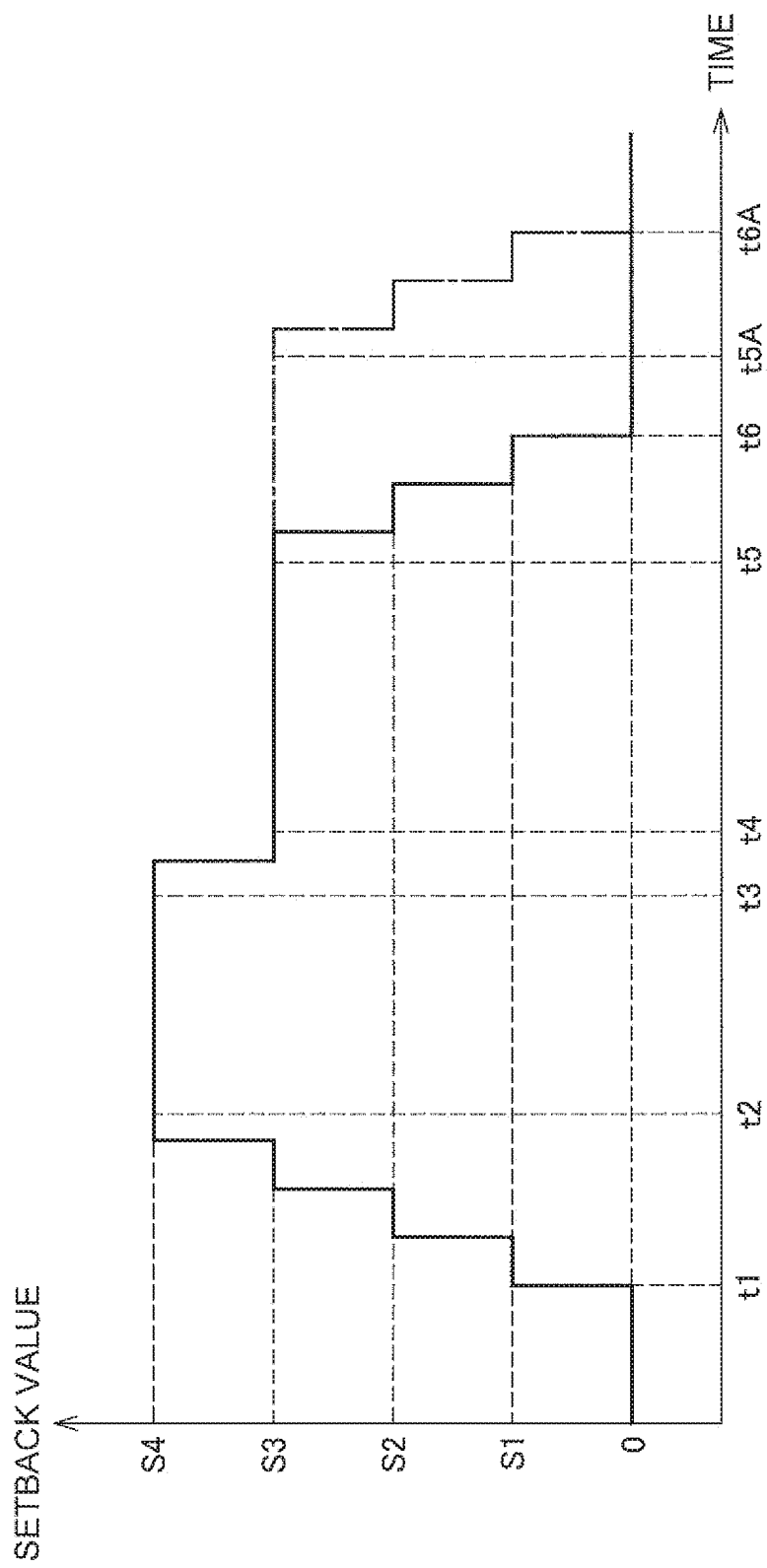
FIG. 5 is a graph corresponding to FIG. 4 and showing the changes over time in setback values.

FIG. 5 is a graph showing the changes over time in setback values while the user 92 is away from the building and traveling along the first away route U1 shown in FIG. 4. The vertical axis represents setback values, and the horizontal axis represents time. In FIG. 5, from time t1 to t2, the user 92 is traveling from the building 90 to the first visit destination 81, which belongs in the distance range R4, and the setback value therefore rises in steps from zero to S4. From time t2 to t3, the user 92 is staying at the first visit destination 81, and the setback value is therefore maintained at S4. From time t3 to t4, the user 92 is traveling from the first visit destination 81 to the second visit destination 82, which belongs in the distance range R3, and the setback value therefore decreases from S4 to S3. From time t4 to t5, the user 92 is staying at the second visit destination 82, and the setback value is therefore maintained at S3. From time t5 to t6, the user 92 is traveling from the second visit destination 82 to the building 90, and the setback value therefore decreases in steps from S3 to zero. The dashed-line graph and times t5A and t6A shown in FIG. 5 are described hereinafter.

Figure 6:
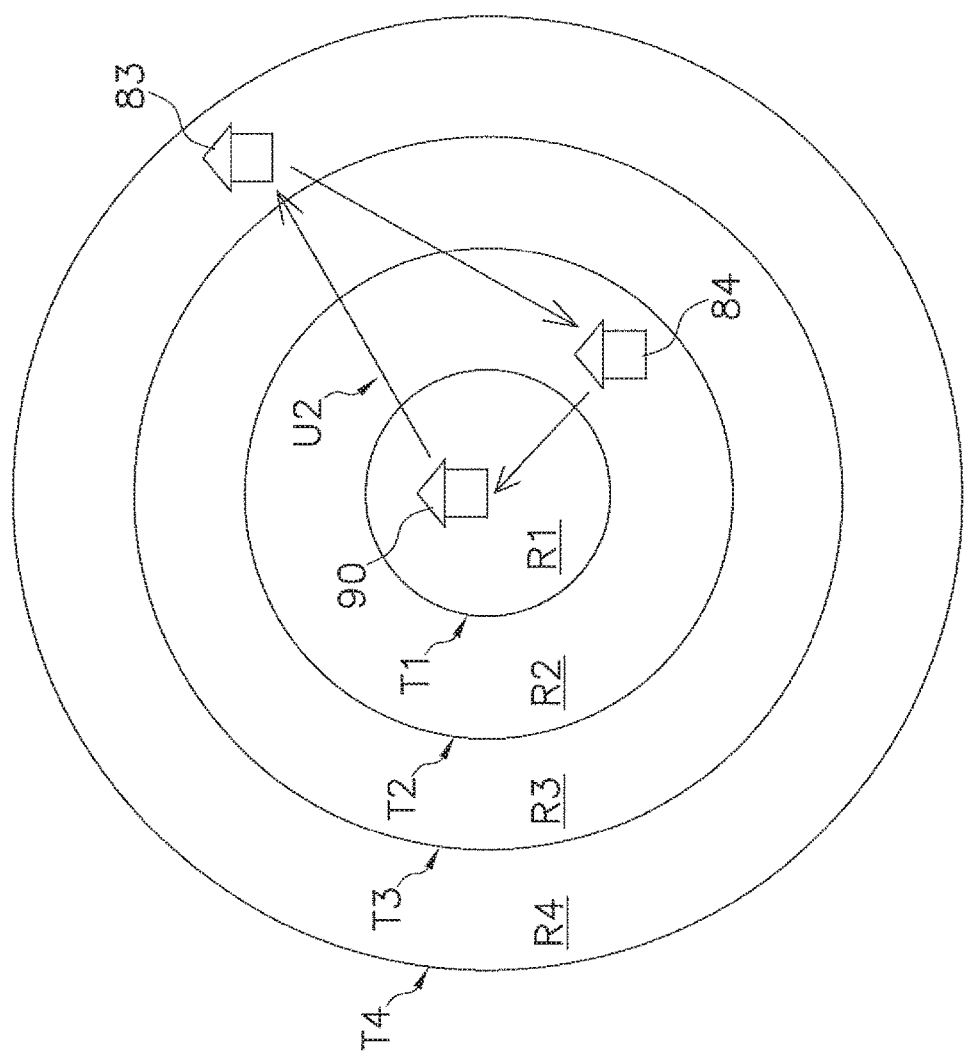
FIG. 6 is a drawing of an example of a behavior pattern of a user while away from the building.

FIG. 6 is a drawing of another example of a behavior pattern while away from the building, for a user 92 holding the portable terminal 20. In FIG. 6, a second away route U2, by which the user 92 leaves the building 90 and then returns, is shown by the arrows. FIG. 6 shows the distance threshold values T1 to T4 and the distance ranges R1 to R4. The user 92 leaves the building 90 at time t11, stays at a third visit destination 83 from time t12 to t13, stays at a fourth visit destination 84 from time t14 to t15, and returns to the building 90 at time t16. The time period from t11 to t12 is a travel time from the building 90 to the third visit destination 83. The time period from time t13 to t14 is a travel time from the third visit destination 83 to the fourth visit destination 84. The time period from time t15 to t16 is a travel time from the fourth visit destination 84 to the building 90. The third visit destination 83 belongs within the distance range R4. The fourth visit destination 84 belongs within the distance range R2.

Figure 7:
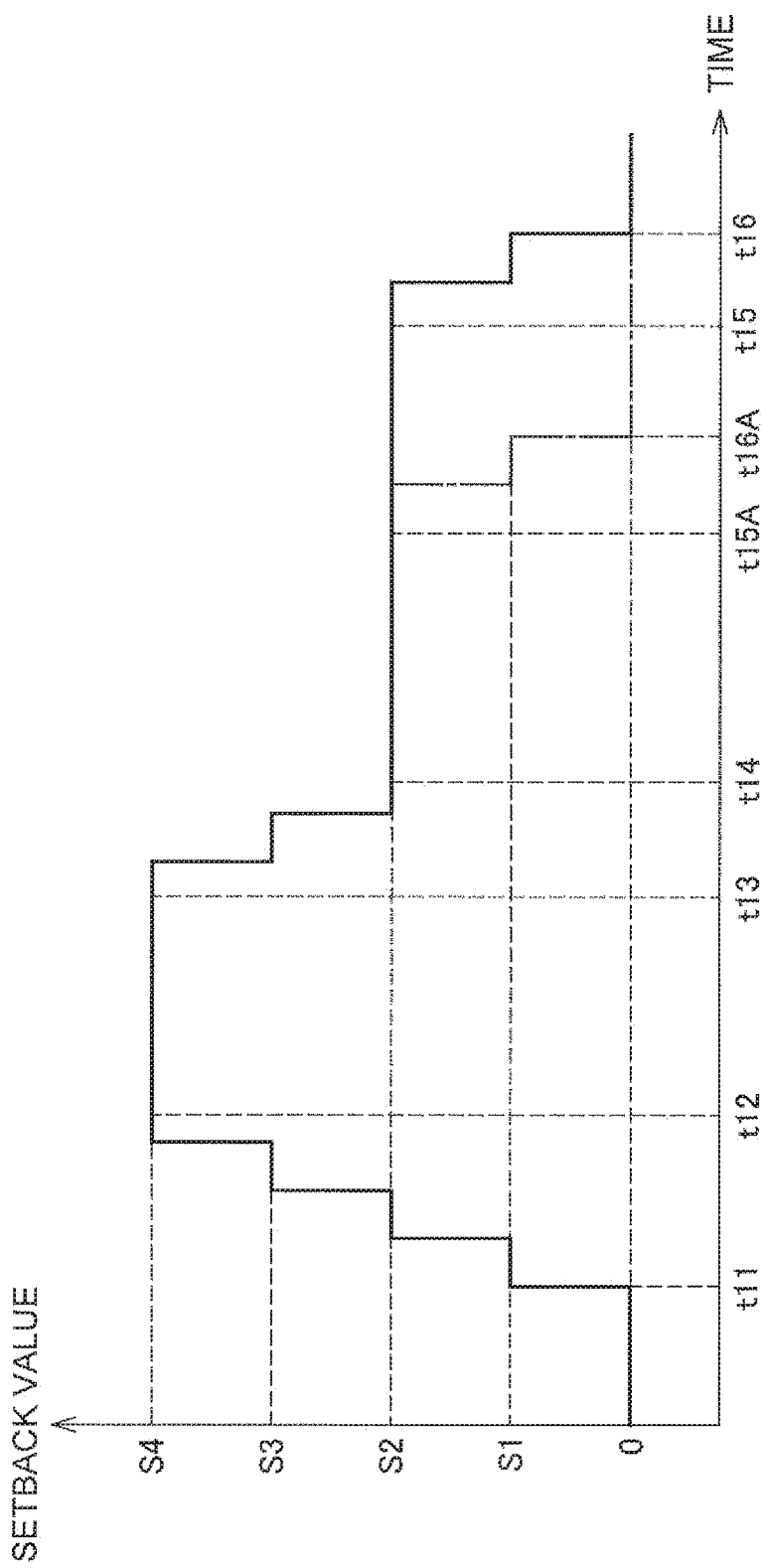
FIG. 7 is a graph corresponding to FIG. 6 and showing the changes over time in setback values.

FIG. 7 is a graph showing the changes over time in setback values while the user 92 is away from the building and traveling along the second away route U2 shown in FIG. 6. The vertical axis represents setback values, and the horizontal axis represents time. In FIG. 7, from time t11 to t12, the user 92 is traveling from the building 90 to the third visit destination 83 which belongs in the distance range R4, and the setback value therefore rises in steps from zero to S4. From time t12 to t13, the user 92 is staying at the third visit destination 83, and the setback value is therefore maintained at S4. From time t13 to t14, the user 92 is traveling from the third visit destination 83 to the fourth visit destination 84 which belongs in the distance range R2, and the setback value therefore decreases from S4 to S2. From time t14 to t15, the user 92 is staying at the fourth visit destination 84, and the setback value is therefore maintained at S2. From time t15 to t16, the user 92 is traveling from the fourth visit destination 84 to the building 90, and the setback value therefore decreases in steps from S2 to zero. The dashed-line graph and times t15A and t16A shown in FIG. 7 are described hereinafter.

While the user 92 is away, the air-conditioning control apparatus 40 automatically controls the setback value in accordance with the current position of the user 92, i.e., the current position of the portable terminal 20 held by the user 92, as shown in FIGS. 5 and 7.

(3) Characteristics

The air-conditioning control system 100 according to the present embodiment includes the air-conditioning control apparatus 40, which automatically controls the set temperature of the air conditioner 50 while the user 92 is away. While the user 92 is away, the air-conditioning control apparatus 40 automatically controls the setback value in accordance with the current position of the user 92, i.e., the current position of the portable terminal 20 held by the user 92. Specifically, the air-conditioning control apparatus 40 increases the setback value as the distance between the building 90 and the portable terminal 20 of the user 92 becomes greater. When the distance between the building 90 and the portable terminal 20 of the user 92 is within a predetermined distance range, the air-conditioning control apparatus 40 can set an optimal setback value corresponding to the distance range by setting the setback value to a predetermined value. The energy consumed by the air conditioner 50 decreases as the setback value becomes greater. Thus, while the user 92 is away from the building 90, the air-conditioning control apparatus 40 performs control to suppress the energy consumed by the air conditioner 50 in the building 90, on the basis of only the distance information indicating how far away the portable terminal 20 held by the user 92 is from the building 90. The air-conditioning control system 100 can thereby both conserve energy and maintain a comfort level by a simple and highly precise method. The reasons for this are described next with reference to the aforementioned FIGS. 4 to 7.

In the prior art, air-conditioning control apparatuses have been used in which the energy consumed by the air conditioner can be suppressed and the comfort level in the building can be maintained by starting up the air conditioner in the building when, on the basis of the position information of the user, the user is determined to be just about to return to the building from their away destination. However, with this type of air-conditioning control apparatus, when the user is away for a short time, there is a risk that the user will be uncomfortable upon returning because of the short time period from the time the air conditioner starts up until the user returns. There is also a risk that the air conditioner will start and stop repeatedly and energy will be needlessly consumed because of the user continuing to travel among away destinations for a long time.

The air-conditioning control system 100 according to the present embodiment does not have the problems described above because until the user 92 returns after having left the building 90, the setback value of the air conditioner 50 is adjusted to control the air conditioner 50 on the basis of only the information pertaining to the distance between the user 92 and the building 90. Specifically, the air-conditioning control apparatus 40 performs control to further increase the setback value of the air conditioner 50 as the distance between the user 92 and the building 90 increases; therefore, the energy consumed by the air conditioner 50 is effectively suppressed when the user 92 is away for a long time, and the comfort level in the building 90 is effectively maintained when the user 92 is away for a short time.

Additionally, because the air-conditioning control system 100 controls the air conditioner 50 on the basis of only information pertaining to the distance between the user 92 and the building 90, the configuration of the air-conditioning control system 100 is simple and the air conditioner 50 can be controlled with good precision.

Additionally, the air-conditioning control system 100 can suppress the energy consumed by the air conditioner 50 and ensure the comfort level in the building 90 even when the return time has been changed due to a change in plans in the away destination of the user 92. Next, two specific examples are given to describe this effect.

First, in the graph representing change over time in setback values shown in FIG. 5, a case is considered in which the time stayed at the second visit destination 82 is extended and the return time is later due to a sudden change in plans for the user 92. The dashed-line graph shown in FIG. 5 represents a state in which the time stayed at the second visit destination 82 has extended from t5 to t5A, and as a result, the return time has also extended from t6 to t6A.

However, in this case as well, the setback value is set on the basis of only the terminal distance, which is the distance between the building 90 and the portable terminal 20 of the user 92. Therefore, as long as the user 92 stays at the second visit destination 82, the setback value remains at S3, and while the user 92 is traveling from the second visit destination 82 to the building 90, the setback value decreases in steps from S3 to zero. Therefore, even when the return time of the user 92 is later, the air-conditioning control system 100 can prevent the start of an unnecessary preparatory air-cooling or air-warming operation before the user 92 returns, and an increase in the energy consumed by the air conditioner 50 can be suppressed.

Next, in the graph representing change over time in setback values shown in FIG. 7, a case is considered in which the time stayed at the fourth visit destination 84 is shortened and the return time is earlier due to a sudden change in plans for the user 92. The dashed-line graph shown in FIG. 7 represents a state in which the time stayed at the fourth visit destination 84 is earlier from t15 to t15A, and as a result, the return time is also earlier from t16 to t16A. However, in this case as well, the setback value is set on the basis of only the terminal distance, which is the distance between the building 90 and the portable terminal 20 of the user 92. Therefore, as long as the user 92 stays at the fourth visit destination 84, the setback value remains at S2, and while the user 92 is traveling from the fourth visit destination 84 to the building 90, the setback value decreases in steps from S2 to zero. Therefore, even when the return time of the user 92 is earlier, the air-conditioning control system 100 can prevent the occurrence or situations in which the comfort level in the building 90 is not ensured because the appropriate preparatory air-cooling or air-warming operation has not yet started when the user 92 returns.

Specifically, with the air-conditioning control system 100, even in cases in which the return time comes to be later because the user 92 changes their plans while away and takes a different route, the air conditioner 50 is not controlled on the basis of the decreased amount of the distance between the user 92 and the air conditioner 50 or the preset temperature, but the setback value is adjusted in accordance with the position of the user 92 to control the air conditioner 50. Therefore, the air-conditioning control system 100 can suppress needless energy consumption. Additionally, with the air-conditioning control system 100, even in cases in which the return time comes to be earlier because the user 92 changes their plans while away and returns from a nearby place, the air conditioner 50 is not stopped, but the setback value is adjusted in accordance with the position of the user 92 to control the air conditioner 50. Therefore, the air-conditioning control system 100 can shorten the time needed until a level comfortable for the user 92 is achieved in the building 90 after the user 92 returns, and can improve the comfort level in the building 90 at the time of return.

As described above, the air-conditioning control system 100 can effectively suppress the energy consumed by the air conditioner 50 while the user 92 is away, even when the time at which the user 92 who is away will return to the building 90 comes to be later than the planned time. Additionally, the air-conditioning control system 100 can, through the air conditioner 50, ensure the comfort level in the building 90 at the time the user 92 returns to the building 90, even when the time at which the user 92 who is away will return to the building 90 comes to be earlier than the planned time.

Second Embodiment (1) Configuration of Air-Conditioning Control System

Figure 8:
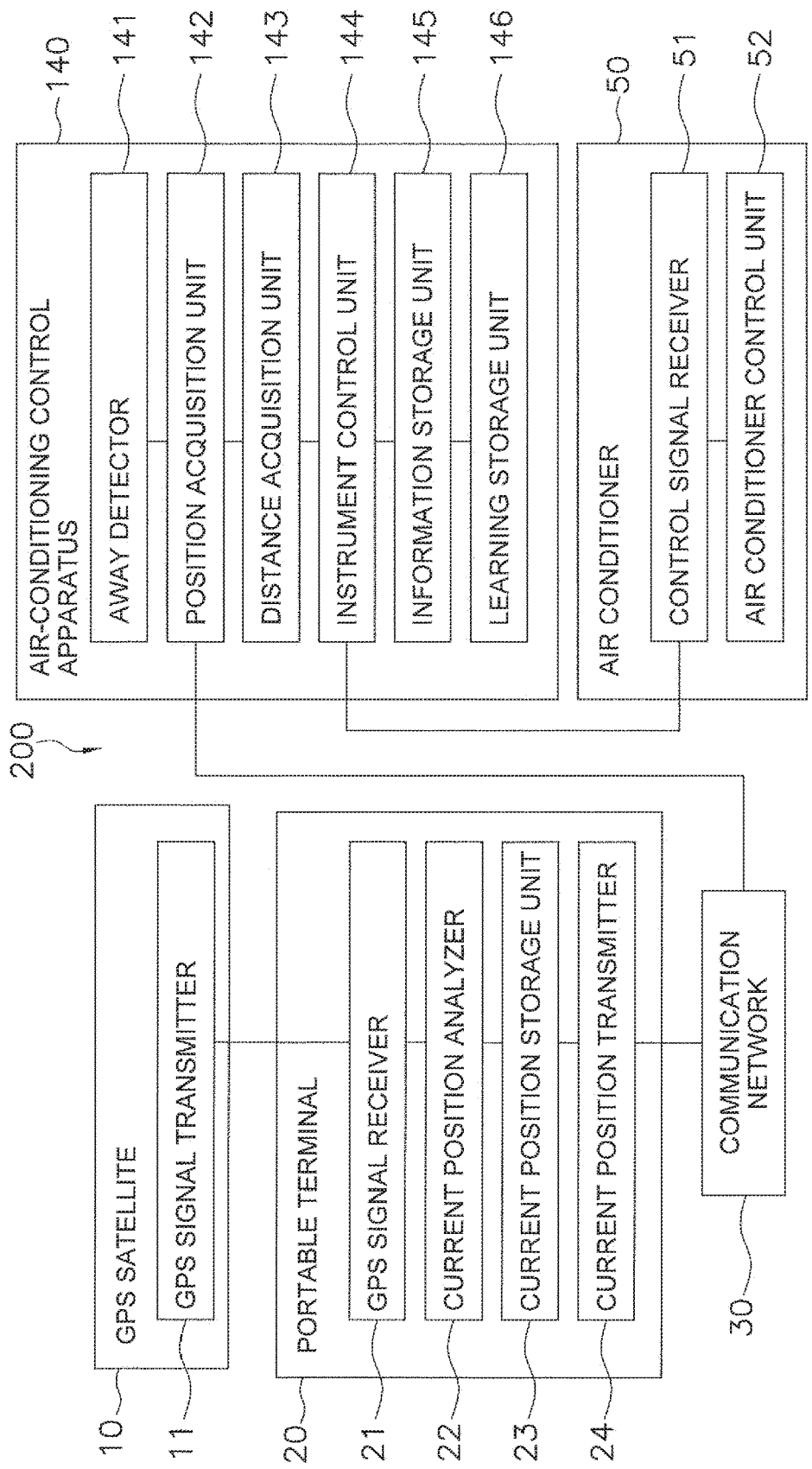
FIG. 8 is a block diagram showing the detailed configuration of an air-conditioning control system according to a second embodiment.

An air-conditioning control system 200 according to a second embodiment of the present invention shall be described. FIG. 8 is a block diagram showing the detailed configuration of the air-conditioning control system 200. The air-conditioning control system 200 of the present embodiment has the same configurations and functions as the air-conditioning control system 100 of the first embodiment, except for an air-conditioning control apparatus 140. Descriptions pertaining to configurations and functions shared with the air-conditioning control system 100 of the first embodiment are omitted.

The air-conditioning control apparatus 140 is mainly provided with an away detector 141, a position acquisition unit 142, a distance acquisition unit 143, an instrument control unit 144, an information storage unit 145, and a learning storage unit 146, as shown in FIG. 8. The away detector 141, the position acquisition unit 142, the distance acquisition unit 143, and the information storage unit 145 have the same functions as, respectively, the away detector 41, the position acquisition unit 42, the distance acquisition unit 43, and the information storage unit 45 of the first embodiment.

The instrument control unit 144 records room temperatures, which are temperatures of a space in which the air conditioner 50 is installed, in a time period starting when the user 92 leaves the building 90 and ending when the user returns. The learning storage unit 146 learns and stores distance threshold values and setback values. Specifically, the learning storage unit 146 changes the distance threshold value and the setback value on the basis of the record of room temperatures kept by the instrument control unit 144, so that the air conditioner 50 consumes a small amount of energy. The instrument control unit 144 controls the air conditioner 50 on the basis of the distance threshold value or the setback value changed by the learning storage unit 146.

(2) Actions of Air-Conditioning Control System

The learning function of the learning storage unit 146, by which the distance threshold value or the setback value is changed, shall be specifically described with reference to the drawings.

(2-1) Learning Function to Change Distance Threshold Value

Figure 9:
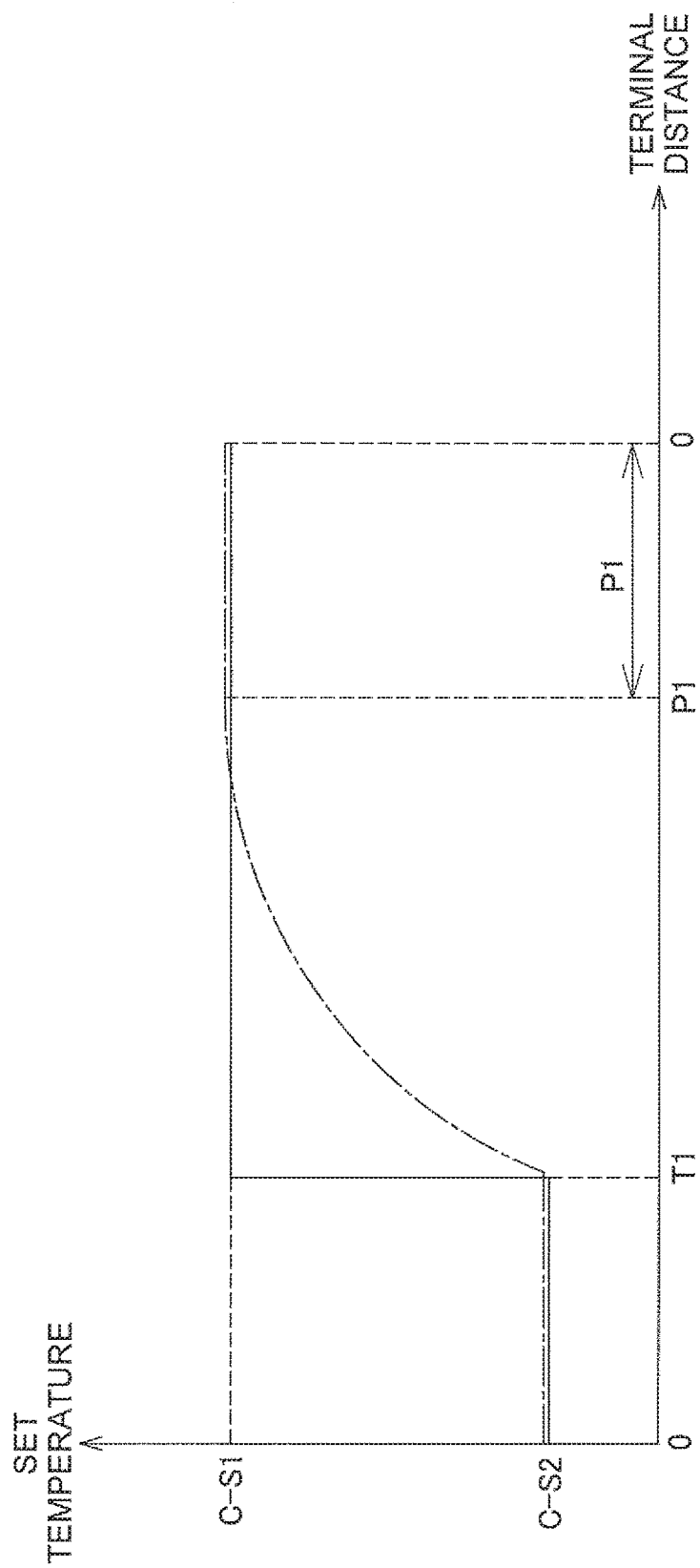
FIG. 9, a graph showing the change in room temperature and set temperature during the air-warming operation, represents a state before a distance threshold value is changed by a learning storage unit.
Figure 10:
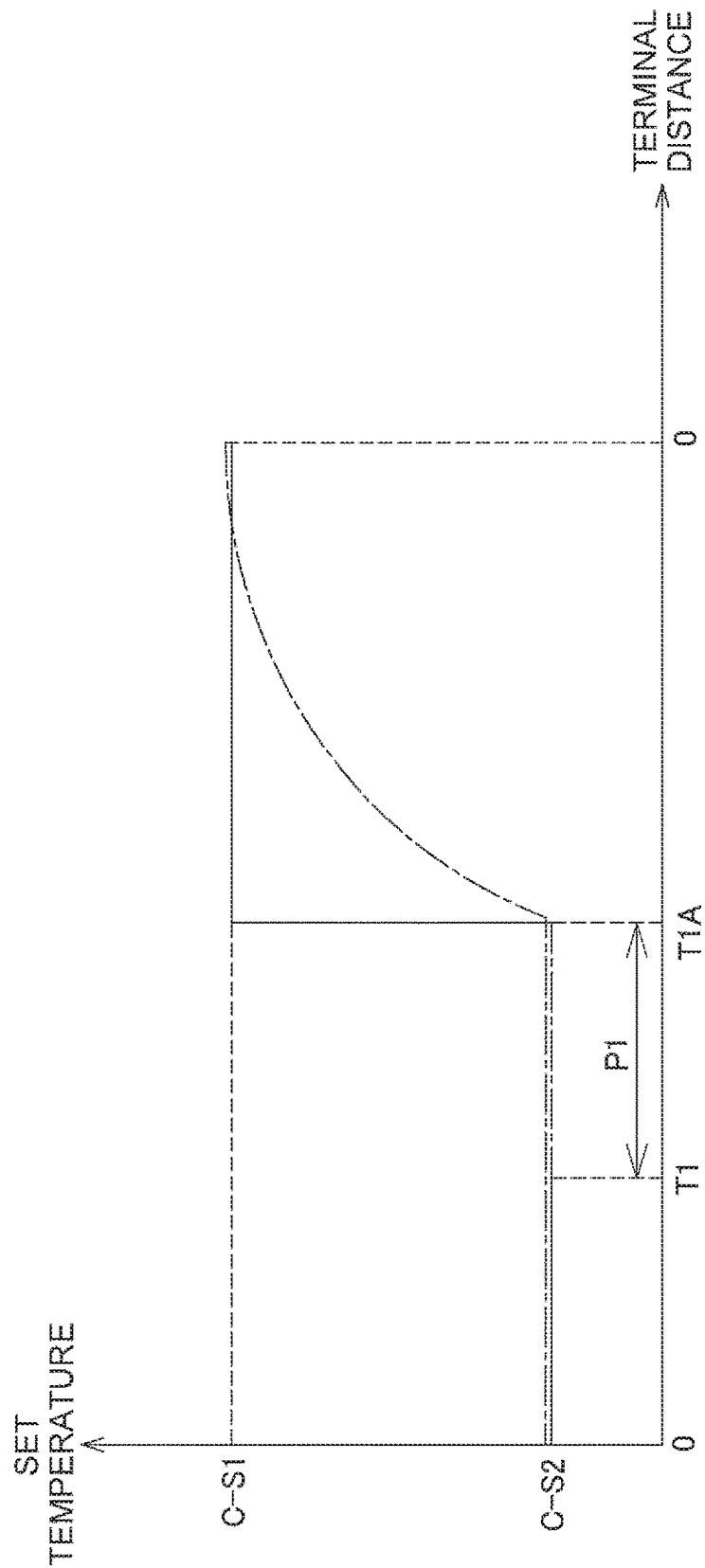
FIG. 10, a graph showing the change in room temperature and set temperature during the air-warming operation, represents a state after the distance threshold value has been changed by the learning storage unit.

Two examples of learning functions by which the learning storage unit 146 changes the distance threshold value shall be described. FIGS. 9 and 10 pertain to a first example, and FIGS. 11 and 12 pertain to a second example.

FIGS. 9 and 10, which relate to the first example, are graphs showing the change in room temperature and set temperature during the air-warming operation. In FIGS. 9 and 10, the change in room temperature immediately before the user 92 returns to the building 90 is shown by a dashed line, and the change in the set temperature of the air conditioner 50 based on the setback value is shown by a solid line. In FIGS. 9 and 10, the vertical axes represent the set temperature of the air conditioner 50 or the room temperature, and the horizontal axes represent the terminal distance. The terminal distance shown on the horizontal axes of FIGS. 9 and 10 decrease from left to right. The setback value changes in accordance with the terminal distance, in the same manner as in the graph shown in FIG. 3 of the first embodiment. FIG. 9 represents a state before the distance threshold value is changed by the learning storage unit 146, and FIG. 10 represents a state after the distance threshold value has been changed by the learning storage unit 146.

In FIG. 9, when the user 92, while returning to the building 90, passes through a spot at which the terminal distance is the distance threshold value T1, the setback value decreases from S2 to S1. At this time, the set temperature rises from a value C−S2, which is an away-time set temperature C minus a setback value S2, to a value C−S1, which is the away-time set temperature C minus a setback value S1. Therefore, when the user passes through a spot at which the terminal distance is the distance threshold value T1, the room temperature gradually rises toward a set temperature C−S1. However, in FIG. 9, the room temperature reaches the set temperature C−S1 before the user 92 has returned to the building 90 (before the terminal distance has reached zero). Specifically, the room temperature reaches the set temperature C−S1 when the terminal distance arrives at a position P1 between the distance threshold value T1 and zero, and the room temperature is thereafter maintained at the set temperature C−S1 until the user 92 returns (until the terminal distance reaches zero). Therefore, while the terminal distance is approaching P1 from zero, the air conditioner 50 maintains the room temperature at the set temperature C−S1 for the building 90 while the user 92 is not inside, and the energy of the air conditioner 50 is therefore needlessly consumed. This circumstance arises because the value of the distance threshold value T1 when the setback value decreases from S2 to S1 is too large, and the room temperature therefore will reach the set temperature C−S1 before the user 92 returns to the building 90.

In this case, in FIG. 9, the learning storage unit 146 measures and stores a terminal distance P1 at the time the room temperature reaches the set temperature C−S1, while the user 92 is returning to the building 90. The learning storage unit 146 then changes the distance threshold value T1 to a value T1A that is smaller than the current value by P1. FIG. 10 represents a state in which the set temperature is changed on the basis of the changed distance threshold value T1A. In FIG. 10, when the user 92, while returning to the building 90, passes through a spot at which the terminal distance is the distance threshold value T1A, the setback value decreases from S2 to S1, and the room temperature therefore gradually rises toward the set temperature C−S1. The room temperature will then have reached the set temperature C−S1 when the user 92 returns to the building 90. Therefore, the needless energy consumption of the air conditioner 50 described above is prevented.

Figure 11:
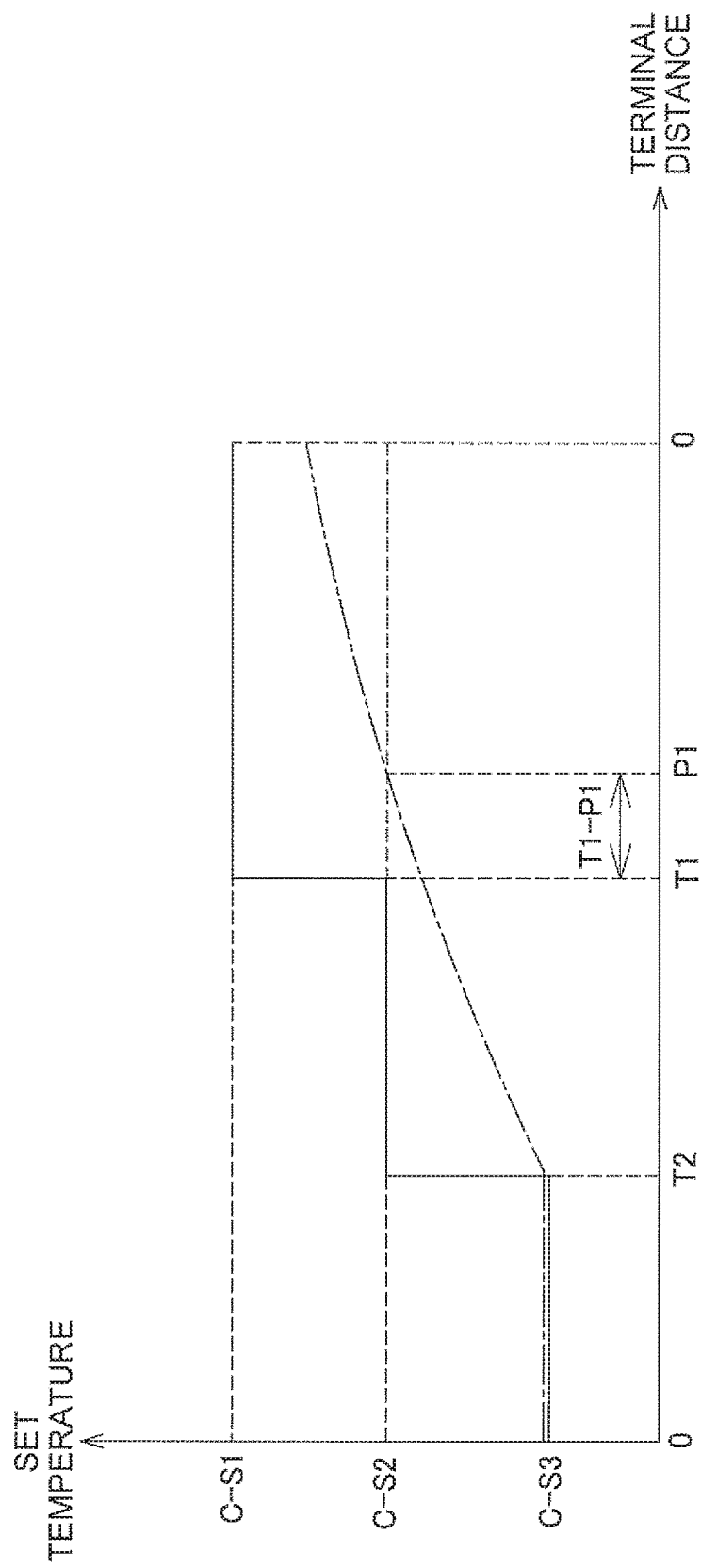
FIG. 11, a graph showing the change in room temperature and set temperature during the air-warming operation, represents a state before the distance threshold value is changed by the learning storage unit.
Figure 12:
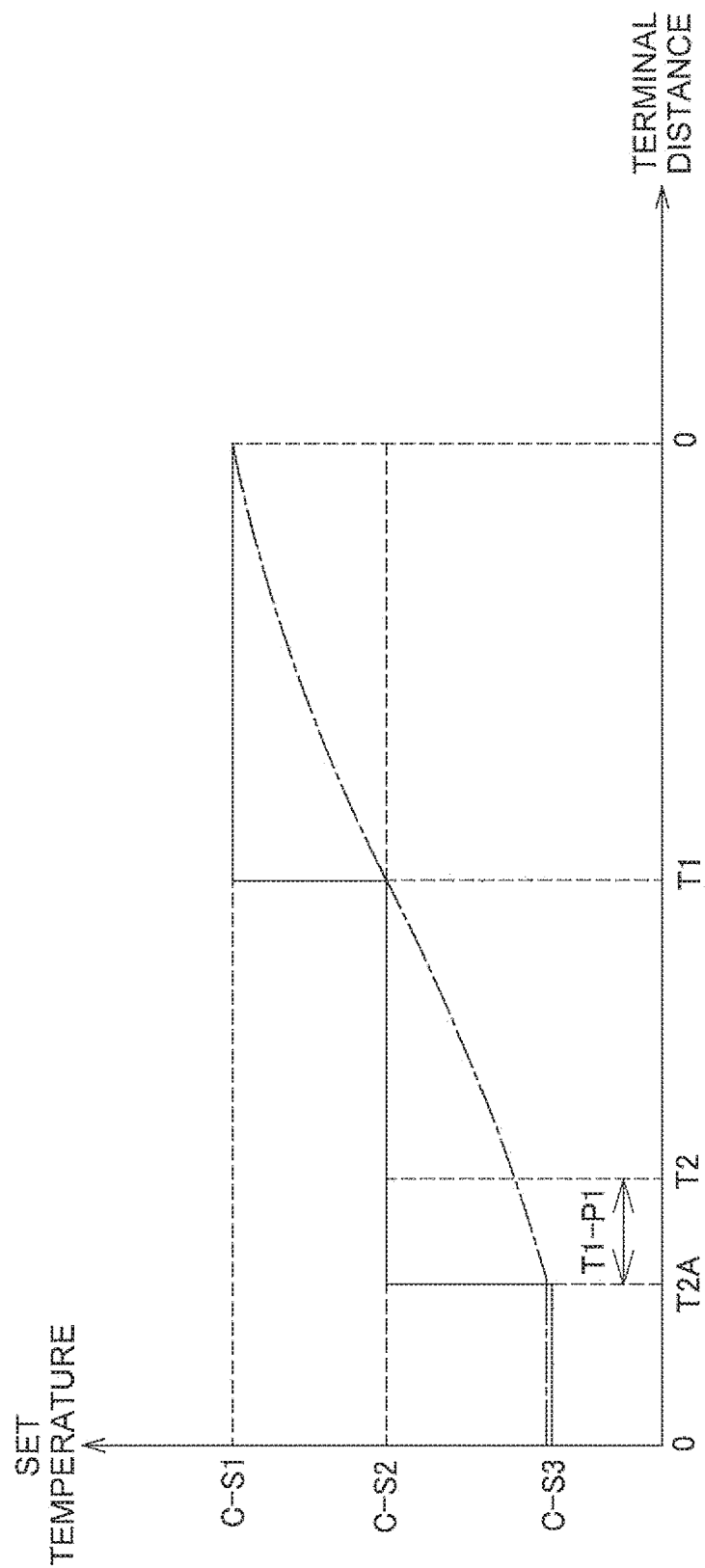
FIG. 12, a graph showing the change in room temperature and set temperature during the air-warming operation, represents a state after the distance threshold value has been changed by the learning storage unit.

FIGS. 11 and 12, which relate to the second example, are graphs similar to those of FIGS. 9 and 10, showing the change in room temperature and set temperature during the air-warming operation. FIG. 11 represents a state before the distance threshold value is changed by the learning storage unit 146, and FIG. 12 represents a state after the distance threshold value has been changed by the learning storage unit 146.

In FIG. 11, when the user 92, while returning to the building 90, passes through a spot at which the terminal distance is a distance threshold value T2, the setback value decreases from S3 to S2. At this time, the set temperature rises from a value C−S3, which is an away-time set temperature C minus a setback value S3, to the value C−S2, which is the away-time set temperature C minus the setback value S2. Additionally, when the user passes through a spot at which the terminal distance is the distance threshold value T1, the setback value decreases from S2 to S1. At this time, the set temperature rises from the value C−S2, which is the away-time set temperature C minus the setback value S2, to the value C−S1, which is the away-time set temperature C minus the setback value S1.

However, in FIG. 11, the room temperature is lower than the set temperature C–S2 when the user 92 passes through the spot at which the terminal distance is the distance threshold value T1. When the terminal distance reaches the position P1 between the distance threshold value T1 and zero, the room temperature will be the set temperature C–S2. Specifically, when the terminal distance is the distance threshold value T1, the room temperature will have not yet reached the set temperature C–S2 based on the set temperature C–S2. In this case, when the user 92 returns to the building 90 (when the terminal distance reaches zero), there is a risk that the room temperature will have not reached the set temperature C–S1 and the comfort level of the space in which the air conditioner 50 is installed will not be ensured. This circumstance arises because the time taken for the terminal distance to shift from the distance threshold value T2 to the distance threshold value T1 is too short, and the room temperature will therefore have not yet reached the set temperature C–S2 when the user 92 passes through the spot at which the terminal distance is the distance threshold value T1.

In this case, in FIG. 11, the learning storage unit 146 measures and stores the terminal distance P1 at the time the room temperature reaches the set temperature C–S2, while the user 92 is returning to the building 90. The learning storage unit 146 then changes the distance threshold value T2 to a value T2A that is greater than the current value by T1–P1. FIG. 12 represents a state in which the set temperature is changed on the basis of the changed distance threshold value T2A. In FIG. 12, when the user 92, while returning to the building 90, passes through a spot at which the terminal distance is the distance threshold value T2A, the setback value decreases from S3 to S2. The room temperature thereafter gradually rises toward the set temperature C–S2. The room temperature will then have reached the set temperature C–S2 when the user 92 passes through the spot at which the terminal distance is the distance threshold value T1. As a consequence, there is a higher possibility of the room temperature having reached the set temperature C–S1 when the user 92 returns to the building 90, as shown in FIG. 12. Therefore, when the user 92 returns to the building 90, the comfort level of the space where the air conditioner 50 is installed is ensured.

(2-2) Learning Function to Change Setback Value

An example of the learning function by which the learning storage unit 146 changes the setback value shall be described with reference to FIGS. 13 and 14.

Figure 13:
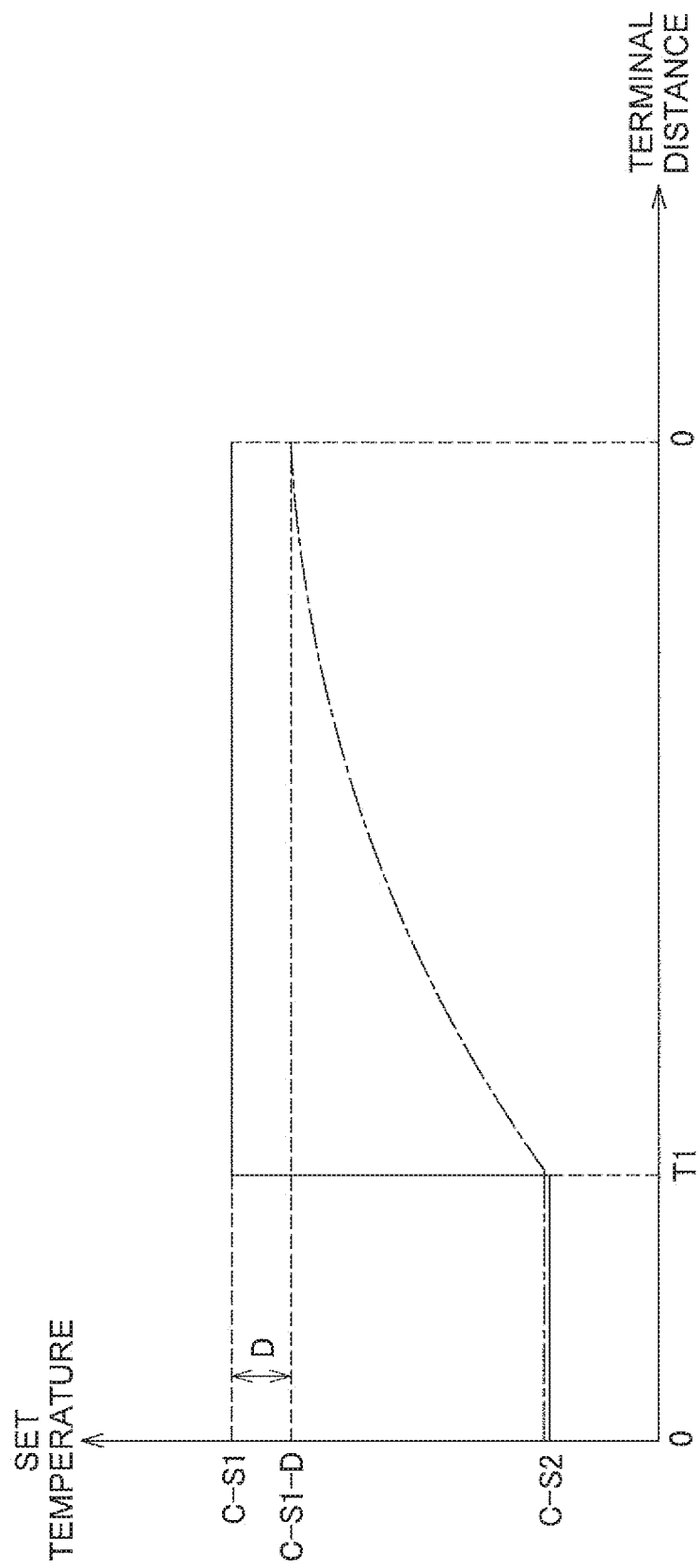
FIG. 13, a graph showing the change in room temperature and set temperature during the air-warming operation, represents a state before the setback value is changed by the learning storage unit.
Figure 14:
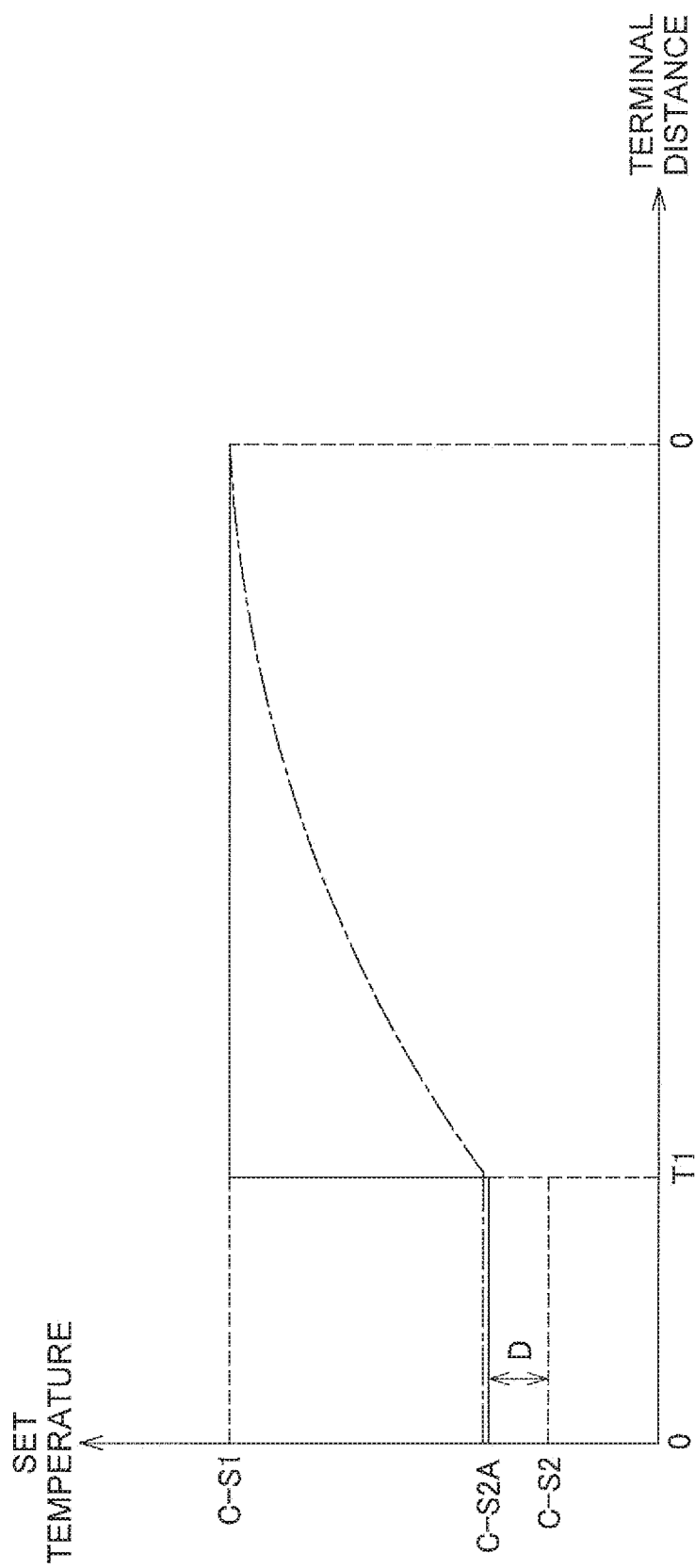
FIG. 14, a graph showing the change in room temperature and set temperature during the air-warming operation, represents a state after the setback value has been changed by the learning storage unit.

FIGS. 13 and 14 are graphs similar to those of FIGS. 9 and 10, showing the change in room temperature and set temperature during the air-warming operation. FIG. 13 represents a state before the setback value is changed by the learning storage unit 146, and FIG. 14 represents a state after the setback value has been changed by the learning storage unit 146.

In FIG. 13, when the user 92, while returning to the building 90, passes through a spot at which the terminal distance is a distance threshold value T1, the setback value decreases from S2 to S1. At this time, the set temperature rises from the value C–S2, which is an away-time set temperature C minus the setback value S2, to the value C–S1, which is the away-time set temperature C minus the setback value S1. Therefore, the room temperature gradually rises toward the set temperature C–S1. However, in FIG. 13, the room temperature has not reached the set temperature C–S1 when the user 92 returns to the building 90 (when the terminal distance reaches zero). Specifically, the room temperature is a temperature C–S1-D that is lower than the set temperature C–S1 by D. Therefore, the comfort level of the space where the air conditioner 50 is installed is not ensured when the user 92 returns to the building 90. This circumstance arises because the setback value S2 is too large, and the room temperature will therefore be unable to reach the set temperature C–S1 by the time the user 92 returns to the building 90.

In this case, in FIG. 13, the learning storage unit 146 measures and stores the room temperature at the time the user 92 returns to the building 90. The learning storage unit 146 then changes the setback value S2 to a value S2A that is smaller than the current value by a difference D between the stored return-time room temperature and the set temperature C–S1. FIG. 14 represents a state in which the set temperature is changed on the basis of the changed setback value S2A. In FIG. 14, when the user 92, while returning to the building 90, passes through a spot at which the terminal distance is the distance threshold value T1, the setback value decreases from S2A to S1. At this time, the set temperature rises from C–S2A to the set temperature C–S1. The room temperature thereafter gradually rises toward the set temperature C–S1. The room temperature will then have reached the set temperature C–S1 by the time the user 92 returns to the building 90. Therefore, when the user 92 returns to the building 90, the comfort level of the space where the air conditioner 50 is installed is ensured.

(3) Characteristics

The air-conditioning control system 200 can set the optimal distance range or the optimal setback value on the basis of the learning of the distance ranges and setback values, and past data pertaining to changes in the room temperature. Therefore, the air-conditioning control system 200 can conserve energy and also maintain the comfort level more efficiently.

(1) Modification A

In the embodiments, the current position of the portable terminal 20 is calculated utilizing the GPS function of the portable terminal 20, and using radio waves received from the plurality of GPS satellites 10. However, the current position of the portable terminal 20 may be calculated utilizing a position-measuring function other than a GPS, as long as measurement error is in a range of up to approximately several dozen meters and the technique can be achieved with an instrument that the user can carry on their person. For example, the current position of the portable terminal 20 may be calculated using a measurement technique of estimating the position of the portable terminal 20 on the basis of the position of a base station of the portable terminal 20.

(2) Modification B

In the embodiments, the air-conditioning control apparatus 40 is a dedicated electronic instrument including a micro-controller and an input/output interface. However, the air-conditioning control apparatus 40 may be a general-purpose computer. In this case, the air-conditioning control apparatus 40 executes programs having the functions of the away detector 41, the position acquisition unit 42, the distance acquisition unit 43, the instrument control unit 44, and the information storage unit 45 to control the air conditioner 50. The air-conditioning control apparatus 40 may be built into the air conditioner 50.

(3) Modification C

In the embodiments, the away detector 41 of the air-conditioning control apparatus 40 analyzes images captured by a monitoring camera installed in an entrance/exit of the building 90, and detects that the user 92 is away. However, the away detector 41 may detect that the user 92 is away by another method. For example, the away detector 41 may use a human detection sensor installed in the entrance/exit of the building 90 to detect that the user 92 is away, or may detect that the user 92 is away on the basis of the current position of the portable terminal 20 of the user 92.

(4) Modification D

In the embodiments, the distance acquisition unit 43 of the air-conditioning control apparatus 40 acquires distance information from the position of the building 90 and from the current position of the portable terminal 20 stored in the information storage unit 45, when the away detector 41 detects that the user 92 is away. However, the distance acquisition unit 43 may acquire distance information using the current position of the air-conditioning control apparatus 40 or the current position of the air conditioner 50 instead of the position of the building 90.

(5) Modification E

In the embodiments, the distance acquisition unit 43 of the air-conditioning control apparatus 40 acquires the terminal distance, which is the linear distance between the current position of the portable terminal 20 and the position of the building 90 on the earth's surface. However, the distance acquisition unit 43 may acquire, as the terminal distance, a distance along a road from the current position of the portable terminal 20 to the position of the building 90. In this case, the distance acquisition unit 43 may acquire map data of the area surrounding the building 90 from the internet etc. and may calculate the terminal distance on the basis of the map data.

(6) Modification F

In the embodiments, the distance acquisition unit 43 of the air-conditioning control apparatus 40 acquires the terminal distance, which is the linear distance between the current position of the portable terminal 20 and the position of the building 90 on the earth's surface. Specifically, the terminal distance in the embodiments is a distance on a two-dimensional plane. However, the distance acquisition unit 43 may use a distance that also accounts for a height direction as the terminal distance. In this case, the terminal distance is a distance within a three-dimensional space. For example, the building 90 could be a high-rise apartment, and the user 92 could be a resident of one room therein. In this case, the terminal distance of the portable terminal 20 outside of the building 90 would be longer for a residence of a user 92 living on an upper floor than for a residence of a user 92 living on a lower floor.

(7) Modification G

In the embodiments, the user 92 is envisioned as being a lone resident of the building 90. However, the air-conditioning control system 100 can be applied also to cases of a plurality of users 92 residing in the building 90. In this case, the users 92 carry personal dedicated portable terminals 20. The distance acquisition unit 43 of the air-conditioning control apparatus 40 acquires a terminal distance, which is the distance between the building 90 and the portable terminal 20, for each of the plurality of portable terminals 20, and the instrument control unit 44 calculates a setback value based on the acquired terminal distance for each of the plurality of portable terminals 20. The instrument control unit 44 then controls the air conditioner 50 on the basis of the smallest calculated setback value. Therefore, the instrument control unit 44 can control the air conditioner 50 so that the comfort level in the building 90 is ensured even when the user 92 carrying the portable terminal 20 having the smallest terminal distance returns to the building 90 ahead of the other users 92.

In the present modification, the optimal setback value can be set and the air conditioner 50 can be controlled even when there are a plurality of users 92 of the building 90. Therefore, the air-conditioning control system 100 according to the present modification can conserve energy as well as maintain the comfort level.

(8) Modification H

In the embodiments, the setback value becomes greater in steps when the terminal distance increases, as shown in FIG. 3. Specifically, the setback value is constant in each of the distance ranges R1 to R4 shown in FIG. 3. However, the setback value may increase as the terminal distance increases. For example, the setback value and the terminal distance may have a linear relationship to each other.

Figure 15:
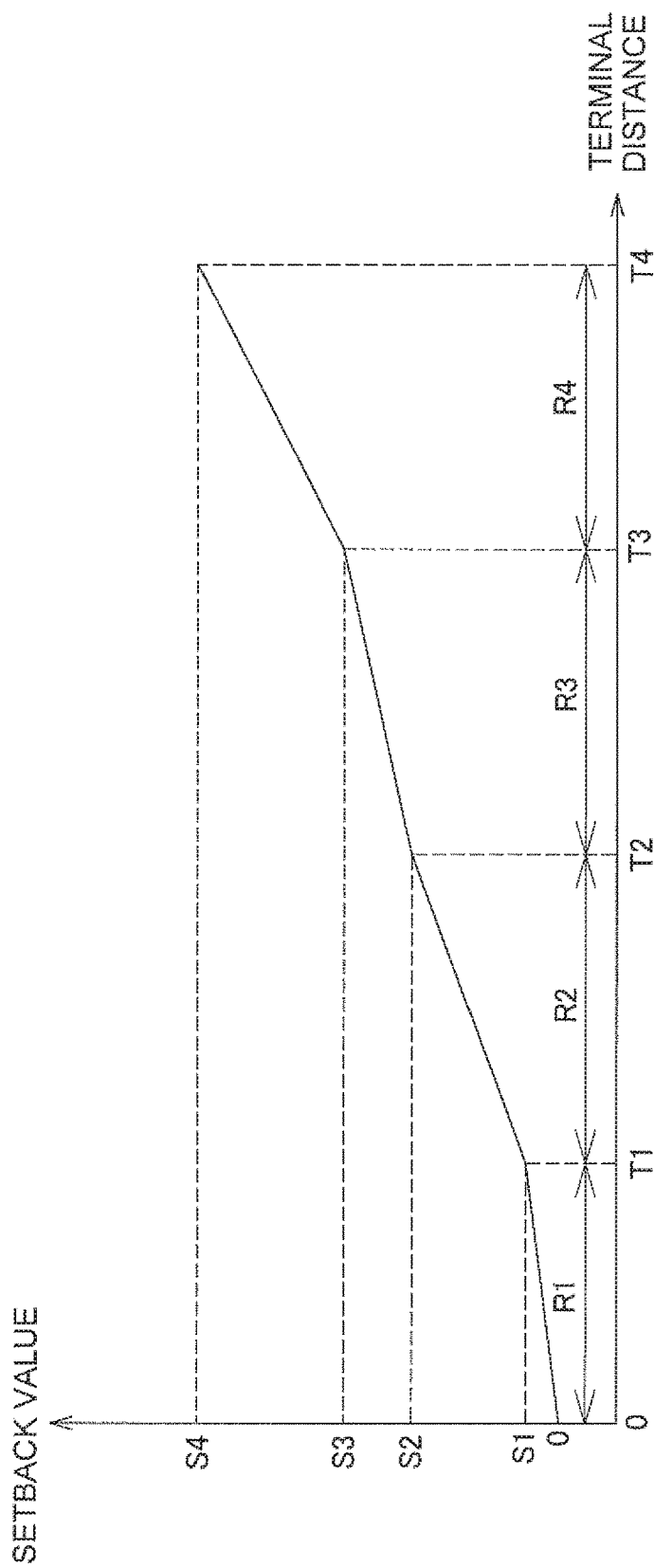
FIG. 15 is a graph showing the relationship between the setback value and the terminal distance according to Modification H.

FIG. 15 is an example of a graph showing the relationship between the setback value and the terminal distance in the present modification. The symbols shown in FIG. 15 have the same meanings as the symbols shown in FIG. 3. In FIG. 15, the setback value increases as the terminal distance increases in each of the distance ranges R1 to R4. In FIG. 15, the rate of change of the setback value relative to the terminal distance is constant in each of the distance ranges R1 to R4.

(9) Modification I

In the embodiments, the setback value becomes greater in steps when the terminal distance increases, as shown in FIG. 3. Specifically, the setback value changes non-continuously at the distance threshold values T1 to T4 shown in FIG. 3. However, the setback value may change continuously near the distance threshold values T1 to T4. Additionally, the setback value may change continuously or non-continuously along a hysteresis curve near the distance threshold values T1 to T4. Setback value chattering is thereby suppressed due to the frequent changes in the setback value near the distance threshold values T1 to T4.

(10) Modification J

In the embodiments, the air-conditioning control apparatus 40 acquires the current position of the portable terminal 20 from the portable terminal 20 via the communication network 30. However, the air-conditioning control apparatus 40 may acquire the current position of the portable terminal 20 from the portable terminal 20 via a dedicated server. In this case, the current position transmitter 24 of the portable terminal 20 transmits the current position of the portable terminal 20 to the dedicated server, and the position acquisition unit 42 of the air-conditioning control apparatus 40 receives the current position of the portable terminal 20 from the dedicated server.

(11) Modification K

In the embodiments, the distance threshold values T1 to T4 and the setback values S1 to S4 are set manually by someone such as a manager of the air-conditioning control system 100. However, the distance threshold values T1 to T4 and the setback values S1 to S4 may be set automatically by the air-conditioning control system 100.

For example, the air-conditioning control apparatus 40 may calculate the optima distance threshold values T1 to T4 and the setback values S1 to S4 in accordance with the movement route of the user 92 outside of the building 90, the seasons, the air-conditioning operation mode, the outside air temperature, and the room temperature.

(12) Modification L

In the second embodiment, the air-conditioning control system 200 can set either the optimal distance range or the optimal setback value on the basis of the learning of the distance ranges and setback values and past data pertaining to changes in the room temperature. However, the air-conditioning control system 200 may set both the optimal distance range and the optimal setback value on the basis of the learning of the distance ranges and setback values and past data pertaining to changes in the room temperature.

(13) Modification M

In the embodiments, the air-conditioning control apparatus 40 estimates the current position of the user 92 on the basis of the current position of the portable terminal 20. However, the air-conditioning control apparatus 40 may utilize an instrument other than the portable terminal 20 to control the air conditioner 50 for cases in which the user 92 leaves having forgotten the portable terminal 20 inside the building 90. Possible examples of such an instrument include, e.g., a human detection sensor installed in the building 90, a device other than the portable terminal 20, a commuter pass, and a company card.

In the case of a human detection sensor installed in the building 90, the air-conditioning control apparatus 40 may determine that the user 92 is not inside the building 90 and control the air conditioner 50 on the basis of the setback value when the human detection sensor is unable to detect the user 92 for a certain time period.

Additionally, in the case of a device other than the portable terminal 20, the user 92 may control the air conditioner 50 on the basis of the setback value by using a personal notebook PC etc. to remotely operate the air-conditioning control apparatus 40.

Additionally, in the case of a commuter pass and a company card, the air-conditioning control apparatus 40 may acquire the current position of the user 92 on the basis of a usage record of the commuter pass and the company card, and may control the air conditioner 50 on the basis of the setback value.

(14) Modification N

The air-conditioning control system 200 of the second embodiment includes the learning storage unit 146 to change the distance threshold value or the setback value. The learning storage unit 146 has a learning function to measure the terminal distance when the room temperature reaches a predetermined value and/or the room temperature when the user 92 returns to the building 90, and to change the distance threshold value or the setback value to a more appropriate value on the basis of the measured data. The learning function of the learning storage unit 146 may be realized through various methods. Next, specific examples of the learning function of the learning storage unit 146 shall be described with reference to the drawings.

Figure 16:
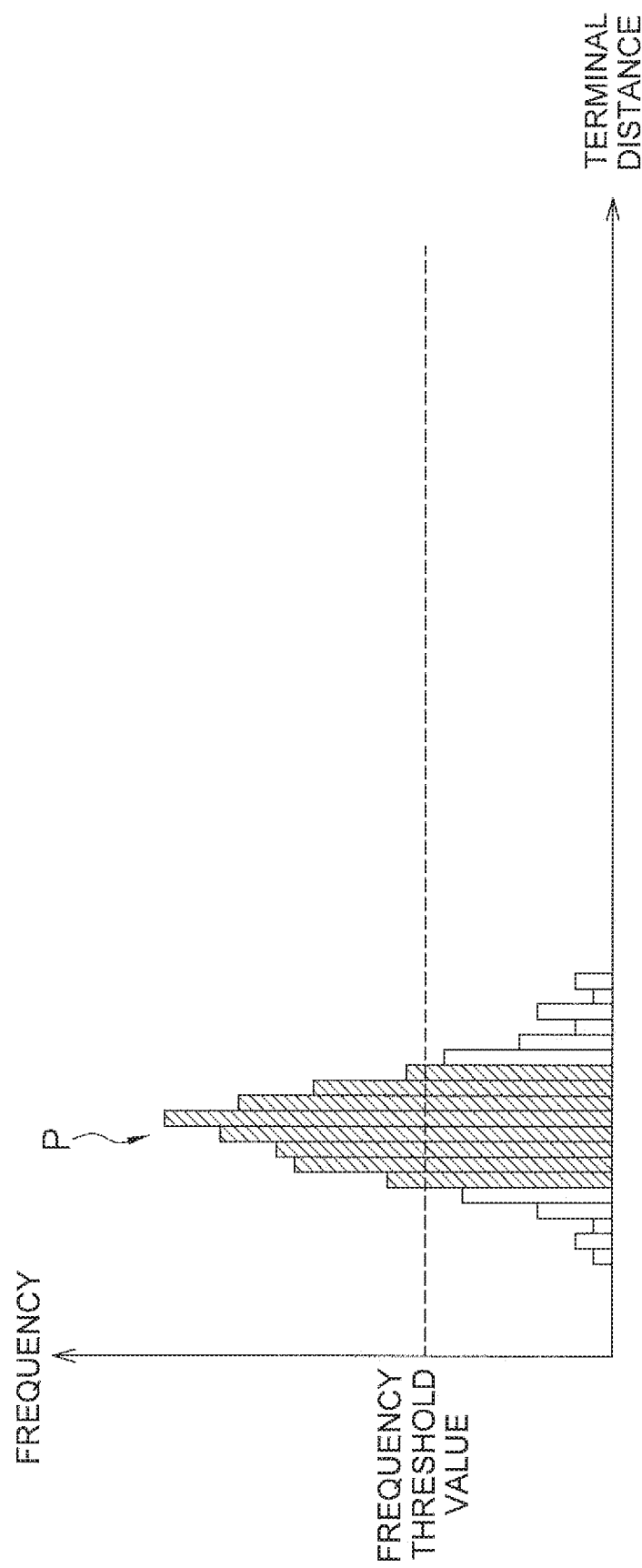
FIG. 16 is an example of a histogram of terminal distances when the room temperature reaches a predetermined value, according to Modification N.

This learning storage unit 146 acquires the terminal distance used to change the distance threshold value from the measured data of the terminal distance when the room temperature reached a predetermined value. For example, while the user 92 is returning to the building 90, the learning storage unit 146 measures the terminal distance P1 when the room temperature reaches the set temperature C−S1, as shown in FIG. 9. First, from past measured data, the learning storage unit 146 creates data represented in a terminal distance histogram. FIG. 16 is an example of a terminal distance histogram. In FIG. 16, the horizontal axis represents levels of terminal distances (positions of bins), and the vertical axis represents the frequency of the bins. The number and width of the bins of the histogram are set as appropriate. For example, the width of a bin is 50 m. Also shown in FIG. 16 is a dotted line parallel to the horizontal axis, which represents a frequency threshold value. The frequency threshold value is set as appropriate.

The learning storage unit 146 determines the terminal distance used to change the distance threshold value on the basis of a bin having a frequency that exceeds the frequency threshold value. FIG. 16 shows one pattern P configured from a bin having a frequency that exceeds the frequency threshold value. In FIG. 16, the bin configuring the pattern P is depicted with hatching. The learning storage unit 146 uses, e.g., the average value of the pattern P as the terminal distance used to change the distance threshold value. The learning storage unit 146 may use any one of the median value, the mode value, the maximum value, and the minimum value of the pattern P, instead of the average value of the pattern P, as the terminal distance used to change the distance threshold value. The learning storage unit 146 regards results data of the terminal distance as nonexistent when there exist no bins having a frequency that exceeds the frequency threshold value.

The learning storage unit 146 can use all of the terminal distances measured in a predetermined time period as the measured data of terminal distances used to create the histogram. The predetermined time period, which is set as appropriate, could be, e.g., a time period of one month up to the present, or a time period of one year up to the present. Additionally, the predetermined time period may be a one-month period of the same month of the previous year.

Figure 17:
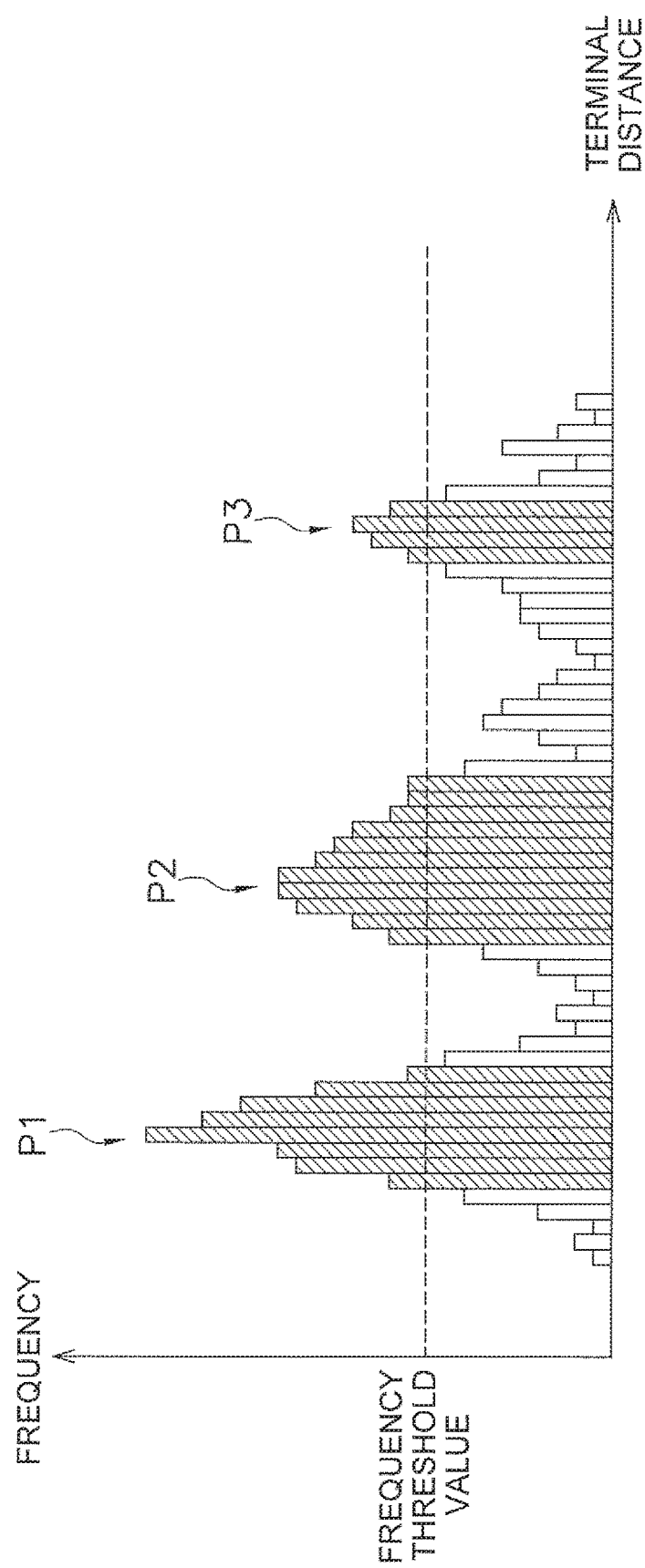
FIG. 17 is an example of a histogram of terminal distances when the room temperature reaches a predetermined value, according to Modification N.

FIG. 17 is another example of a terminal distance histogram. FIG. 17 shows three patterns configured from bins having frequencies that exceed a frequency threshold value. Patterns P1 to P3 are shown in order beginning with shortest terminal distance in FIG. 17. The bins configuring the patterns P1 to P3 are shown with hatching in FIG. 17. In this case, the learning storage unit 146 determines a terminal distance used to change the distance threshold value for each of the patterns P1 to P3. In the case of FIG. 17, the learning storage unit 146 determines three terminal distances corresponding to the respective patterns P1 to P3. When a plurality of terminal distances are determined in this manner, the instrument control unit 144 may use the determined terminal distances separately depending on various conditions. The various conditions are, inter alia, the current day, the current time, the weather, and the plans of the user 92. For example, the instrument control unit 144 may change the distance threshold value on the basis of the terminal distance corresponding to the pattern P1 when the current time is 11:00 am, change the distance threshold value on the basis of the terminal distance corresponding to the pattern P2 when the current day is Sunday, and change the distance threshold value on the basis of the terminal distance corresponding to the pattern P3 when the weather is rainy.

With the method described above, the learning storage unit 146 determines the terminal distance used to change the distance threshold value on the basis of the measured data of terminal distances when the room temperature reached the predetermined value. Similarly, the learning storage unit 146 may determine the room temperature used to change the setback value on the basis of measured data of room temperatures when the user 92 returned to the building 90.

(15) Modification O

In the embodiments, the air-conditioning control apparatus 40 controls the setback value. However, the air-conditioning control apparatus 40 may control the operating frequency of the air conditioner 50. The operating frequency of the air conditioner 50 is the operating frequency of a compressor inside the air conditioner 50.

The air-conditioning control apparatus 40 of the present modification controls the air conditioner 50 by changing the operating frequency of the air conditioner 50 on the basis of the distance information while the user 92 is away. For example, as the distance between the portable terminal 20 and the building 90 becomes longer, the air-conditioning control apparatus 40 further lowers the operating frequency of the air conditioner 50 and reduces the energy consumed by the air conditioner 50. Additionally, as the distance between the portable terminal 20 and the building 90 becomes longer, the air-conditioning control apparatus 40 may further lower the upper limit of the operating frequency of the air conditioner 50 and reduce the energy consumed by the air conditioner 50. Additionally, when the distance between the portable terminal 20 and the building 90 is equal to or greater than a predetermined value, the air-conditioning control apparatus 40 may fix the operating frequency of the air conditioner 50 at a predetermined value or stop the air conditioner 50 to reduce the energy consumed by the air conditioner 50. The air-conditioning control system 100 according to the present modification can conserve energy as well as maintain the comfort level, similar to the air-conditioning control system 100 of the embodiments.

(16) Modification P

In Modification O, the air-conditioning control apparatus 40 controls the operating frequency of the air conditioner 50 on the basis of the distance information while the user 92 is away. However, the air-conditioning control apparatus 40 may set a lower limit value and an upper limit value of the operating frequency of the air conditioner 50. For example, the instrument control unit 44 of the air-conditioning control apparatus 40 changes the operating frequency of the air conditioner 50 to be within a range from a predetermined lower limit value to a predetermined upper limit value. In this case, the operating frequency of the air conditioner 50 does not fall below the predetermined lower limit value and does not rise above the predetermined upper limit value.

Figure 18:
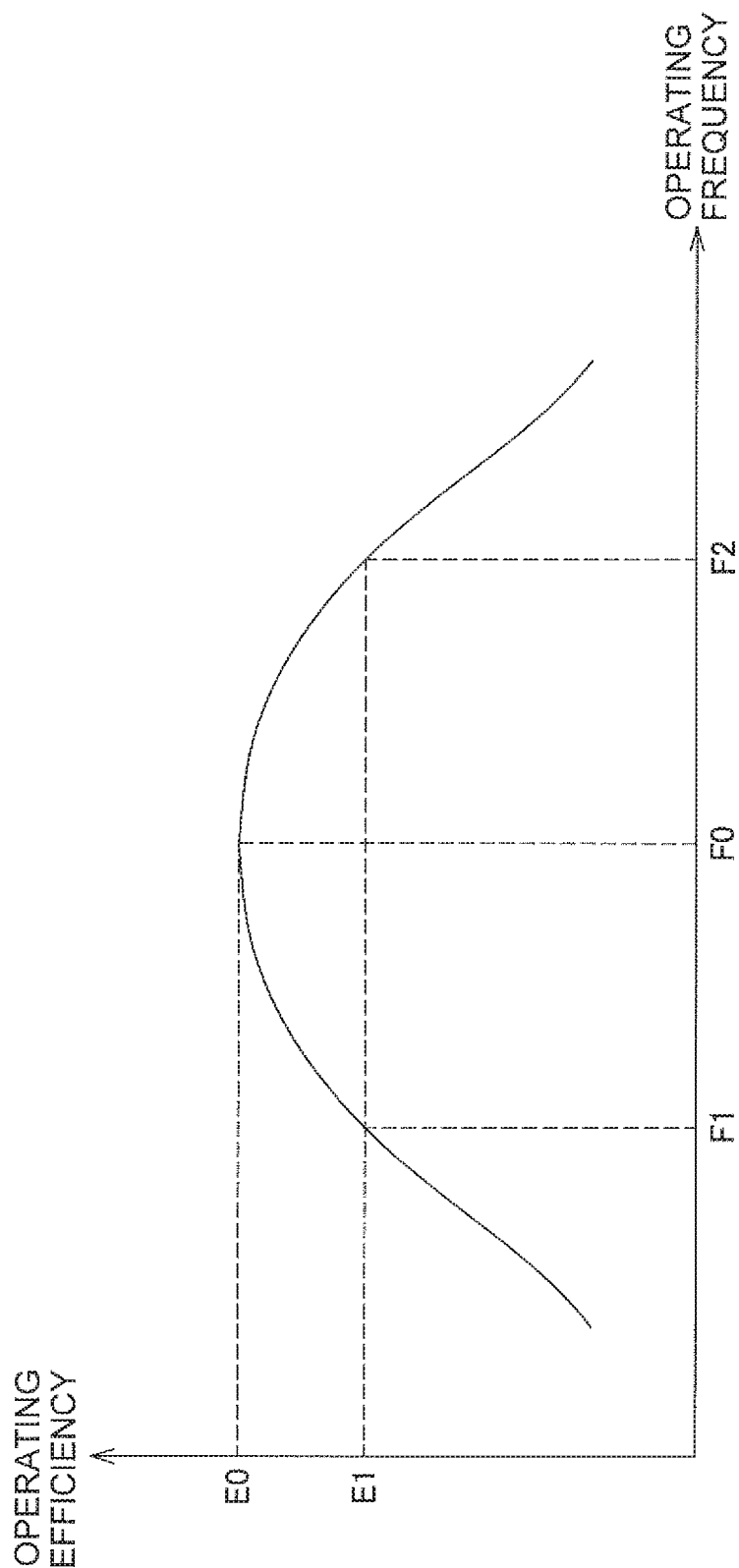
FIG. 18 is a graph representing the relationship between operating frequency of an air conditioner and operating efficiency of an air conditioner, according to Modification P.

FIG. 18 is a graph representing the relationship between the operating frequency of the air conditioner 50 and the operating efficiency of the air conditioner 50. In the graph of FIG. 18, the horizontal axis represents the operating frequency of the air conditioner 50, and the vertical axis represents the operating efficiency of the air conditioner 50. The operating efficiency of the air conditioner 50 reaches a maximum value E0 at a predetermined operating frequency F0, and exhibits a tendency to monotonically decrease from E0 as the operating frequency becomes greater from F0 or as the operating frequency becomes smaller from F0, as shown in FIG. 18. Therefore, in cases in which, e.g., the operating frequency of the air conditioner 50 is further lowered in order to increase the setback value as the distance between the portable terminal 20 of the user 92 and the building 90 becomes longer, there is a risk of the operating efficiency of the air conditioner 50 becoming too low.

In the present modification, because a lower limit value and an upper limit value are set on the operating frequency of the air conditioner 50, the occurrence of the problem of a too-low operating efficiency of the air conditioner 50 is suppressed. Specifically, a lower limit value E1 of the operating efficiency of the air conditioner 50 is set in the air-conditioning control apparatus 40 on the basis of the distance information. In this case, a lower limit value F1 and an upper limit value F2 of the operating frequency of the air conditioner 50 are, respectively, a minimum value F1 and a maximum value F2 of an operating frequency range in which the operating efficiency of the air conditioner 50 is equal to or greater than the lower limit value E1, as shown in FIG. 18. The air-conditioning control system 100 according to the present modification is able to efficiently operate the air-conditioning control apparatus 40 because the operating efficiency of the air conditioner 50 does not fall below the lower limit value E1 while the user 92 is away.

The instrument control unit 44 of the air-conditioning control apparatus 40 may set the lower limit value E1 of the operating efficiency of the air conditioner 50 progressively higher as the distance between the portable terminal 20 of the user 92 and the building 90 becomes longer. The air-conditioning control system 100 is thereby able to operate the air-conditioning control apparatus 40 more efficiently.

(17) Modification Q

In the embodiments, the air-conditioning control apparatus 40 controls the setback value. The setback value is the difference between the away-time set temperature, which is the set temperature of the air conditioner 50 when the away detector 41 detects that the user 92 is away, and the current set temperature of the air conditioner 50. However, during the air-cooling operation, the air-conditioning control apparatus 40 may also control an evaporation temperature of a refrigerant of the air conditioner 50 in addition to controlling the setback value. Specifically, during the air-cooling operation, the air-conditioning control apparatus 40 may perform a control to raise the evaporation temperature of the refrigerant of the air conditioner 50. The air-conditioning control system 100 is thereby able to operate the air-conditioning control apparatus 40 more efficiently.

Additionally, the air-conditioning control system 100 may control the evaporation temperature of the refrigerant of the air conditioner 50 on the basis of the distance information while the user 92 is away, in order to achieve even more efficient operation. For example, the air-conditioning control system 100 may perform a control to further raise the evaporation temperature of the refrigerant of the air conditioner 50 as the distance between the portable terminal 20 of the user 92 and the building 90 becomes longer.

The air-conditioning control system 100 can also operate the air-conditioning control apparatus 40 more efficiently by performing either a combination control that combines the control of the present modification and the control of Modification O, or a combination control that combines the control of the present modification and the control of Modification P.

(18) Modification R

In the embodiments, the air-conditioning control apparatus 40 controls the setback value. The setback value is the difference between the away-time set temperature, which is the set temperature of the air conditioner 50 when the away detector 41 detects that the user 92 is away, and the current set temperature of the air conditioner 50. However, during an operation, the air-conditioning control apparatus 40 may also control a water supply temperature or an air supply temperature of the air conditioner 50 in addition to controlling the setback value. Specifically, the air-conditioning control apparatus 40 may perform a control to raise the water supply temperature or the air supply temperature of the air conditioner 50 during the air-cooling operation, and to lower the water supply temperature or the air supply temperature of the air conditioner 50 during the air-warming operation. The air-conditioning control system 100 is thereby able to operate the air-conditioning control apparatus 40 more efficiently.

Additionally, for operation to be even more efficient, the air-conditioning control system 100 may control the water supply temperature or the air supply temperature of the air conditioner 50 on the basis of the distance information while the user 92 is away. For example, the air-conditioning control system 100 may perform a control to further raise the water supply temperature or the air supply temperature of the air conditioner 50 during the air-cooling operation, and to further lower the water supply temperature or the air supply temperature of the air conditioner 50 during the air-warming operation, as the distance between the portable terminal 20 of the user 92 and the building 90 becomes longer.

The air-conditioning control system 100 can also operate the air-conditioning control apparatus 40 more efficiently by performing either a combination control that combines the control of the present modification and the control of Modification O, or a combination control that combines the control of the present modification and the control of Modification P.

Additionally, the air-conditioning control system 100 can operate the air-conditioning control apparatus 40 more efficiently by performing either a combination control that combines the control of the present modification, the control of Modification Q, and the control of Modification O, or a combination control that combines the control of the present modification, the control of Modification Q, and the control of Modification P.

(19) Modification S

In the embodiments, the air conditioner 50 is an air-cooling and air-warming instrument including a refrigeration circuit. The air conditioner 50 may include various air-warming apparatuses. For example, the air conditioner 50 may include a heat pump, a boiler, or a furnace (a gas furnace etc.) as an air-warming apparatus. Additionally, the air conditioner 50 may include, as an air-warming apparatus, a hybrid instrument of a heat pump and a boiler, or a hybrid instrument of a heat pump and a furnace.

The air-conditioning control apparatus 40 of Modification P can use a heat pump, a boiler, a furnace, and the aforementioned hybrid instruments as the air conditioner 50. The air-conditioning control apparatus 40 of Modification Q can use a heat pump and the aforementioned hybrid instruments as the air conditioner 50. The air-conditioning control apparatus 40 of Modification R can use a heat pump, a boiler, a furnace, and the aforementioned hybrid instruments as the air conditioner 50.

When a boiler or a furnace is used as the air-warming apparatus, the air-conditioning control apparatus 40 can suppress the amount of energy consumed or perform an operation that accounts for efficiency by, inter alia, adjusting the fuel supply rate instead of the operating frequency of the compressor inside the air conditioner 50.

(20) Modification T

In the embodiments, the air-conditioning control apparatus 40 is a computer installed in the building 90. However, the air-conditioning control apparatus 40 may be a computer installed outside the building 90 and connected to the air conditioner 50 inside the building 90 via the internet or another network. In this case, the function of the air-conditioning control apparatus 40 may be a service provided in the form of cloud computing. In this modification, the function of the air-conditioning control apparatus 40 is actualized through the programs of, inter alia, the away detector 41, the position acquisition unit 42, the distance acquisition unit 43, the instrument control unit 44, and the information storage unit 45.

INDUSTRIAL APPLICABILITY

The air-conditioning control apparatus according to the present invention can conserve energy as well as maintain a comfort level.

What is claimed is:

1. An air-conditioning control apparatus, comprising:
an away detector to detect that a user is away from a building;
a position acquisition unit to acquire position information of a portable terminal carried by the user;
a distance acquisition unit to use the position information acquired by the position acquisition unit to acquire distance information indicating how far the portable terminal is from the building when the away detector has detected that the user is away from the building;
an instrument control unit to control an air conditioner installed in the building based on the distance information acquired by the distance acquisition unit so that the air conditioner consumes less energy; and
a learning storage unit,
the instrument control unit controlling the air conditioner by changing a setback value, which is a difference between a set temperature of the air conditioner when the away detector detects that the user is away from the building, and a current set temperature,
the distance acquisition unit acquiring a distance between the building and the portable terminal as the distance information,
when the air conditioner is performing an air-warming operation, the instrument control unit progressively increasing the setback value to lower the set temperature as the distance between the building and the portable terminal becomes longer,
when the air conditioner is performing an air-cooling operation, the instrument control unit progressively increasing the setback value to raise the set temperature as the distance between the building and the portable terminal becomes longer,
the instrument control unit using a plurality of distance ranges based on a plurality of preset distance threshold values to change the setback value in accordance with the distance range to which the distance belongs,
the learning storage unit learning and storing the distance threshold value and the setback value,
by changing the distance threshold value based on the distance at the time a room temperature, which is a temperature of a space in which the air conditioner is installed, reaches the set temperature while the user is returning to the building, and
by changing the setback value based on the room temperature at the time the user returns to the building, and
the instrument control unit referring to the learning storage unit to change the distance threshold value or the setback value so that the air conditioner consumes less energy.

2. The air-conditioning control apparatus according to claim 1, wherein
the portable terminal is one of a plurality of portable terminals, the instrument control unit calculates the setback value based on the distance for each one of the plurality of the portable terminals, and controls the air conditioner using the smallest setback value.

3. The air-conditioning control apparatus according to claim 1, wherein
the instrument control unit controls the air conditioner via any one of
a first control to change an operating frequency of the air conditioner,
a second control to change an evaporation temperature of a refrigerant of the air conditioner,
a third control to change a water supply temperature or an air supply temperature of the air conditioner, a fourth control that is a combination control of the first control and the second control, a fifth control that is a combination control of the first control and the third control, and a sixth control that is a combination control of the first control, the second control, and the third control.

4. The air-conditioning control apparatus according to claim 3, wherein the instrument control unit changes the operating frequency to be within a range from a predetermined lower limit value to a predetermined upper limit value in the first control, the fourth control, the fifth control, and the sixth control.

5. The air-conditioning control apparatus according to claim 2, wherein the instrument control unit controls the air conditioner via any one of a first control to change an operating frequency of the air conditioner, a second control to change an evaporation temperature of a refrigerant of the air conditioner, a third control to change a water supply temperature or an air supply temperature of the air conditioner, a fourth control that is a combination control of the first control and the second control, a fifth control that is a combination control of the first control and the third control, and a sixth control that is a combination control of the first control, the second control, and the third control.

6. The air-conditioning control apparatus according to claim 5, wherein the instrument control unit changes the operating frequency to be within a range from a predetermined lower limit value to a predetermined upper limit value in the first control, the fourth control, the fifth control, and the sixth control.

* * * * *